United States Patent
Kimura et al.

(10) Patent No.: US 10,303,300 B2
(45) Date of Patent: May 28, 2019

(54) LIQUID CRYSTAL DISPLAY DEVICE AND DISPLAY DEVICE SUBSTRATE

(71) Applicant: TOPPAN PRINTING CO., LTD., Tokyo (JP)

(72) Inventors: Yukihiro Kimura, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 123 days.

(21) Appl. No.: 15/429,713

(22) Filed: Feb. 10, 2017

(65) Prior Publication Data

US 2017/0153766 A1 Jun. 1, 2017

Related U.S. Application Data

(63) Continuation of application No. PCT/JP2014/073513, filed on Sep. 5, 2014.

(51) Int. Cl.
  *G06F 3/041* (2006.01)
  *G06F 3/044* (2006.01)
  (Continued)

(52) U.S. Cl.
  CPC .......... *G06F 3/0418* (2013.01); *G02F 1/1333* (2013.01); *G02F 1/1335* (2013.01);
  (Continued)

(58) Field of Classification Search
  CPC ................. G06T 7/0004; G06T 7/90; G06T 2207/30121; G06T 2207/10056;
  (Continued)

(56) References Cited

U.S. PATENT DOCUMENTS

| 5,850,271 A | 12/1998 | Kim et al. |
| 2010/0149116 A1 | 6/2010 | Yang et al. |

(Continued)

FOREIGN PATENT DOCUMENTS

| CN | 103235439 A | * 8/2013 | ......... G02F 1/13338 |
| CN | 103235439 A | 8/2013 | |

(Continued)

OTHER PUBLICATIONS

Extended European Search Report dated Mar. 20, 2018 in corresponding application No. 14901023.3.

(Continued)

*Primary Examiner* — Alexander Eisen
*Assistant Examiner* — Kebede T Teshome
(74) *Attorney, Agent, or Firm* — Foley & Lardner LLP

(57) ABSTRACT

A liquid crystal display device including: a counter substrate having a first transparent substrate, a laminate structure of a black layer and a first metal layer, and a plurality of terminal portions; a liquid crystal layer; an array substrate having a second transparent substrate, an active element, a second wiring layer formed of a second metal layer, and a light shielding layer. The counter substrate has the first wiring layer, a black matrix, and a first transparent resin layer laminated in this order. The black matrix has a line width larger than a line width (M1W) of the first wiring layer, overlapping the first wiring layer so as to include a pattern of the first wiring layer. The active element is covered with a light shielding pattern via a first insulation layer. A change in electrostatic capacitance produced between the first wiring layer and the second wiring layer is detected.

16 Claims, 18 Drawing Sheets

(51) Int. Cl.
*G06F 3/047* (2006.01)
*G02F 1/1333* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC ........ *G02F 1/1368* (2013.01); *G02F 1/13338* (2013.01); *G02F 1/133345* (2013.01); *G02F 1/133512* (2013.01); *G02F 1/133514* (2013.01); *G02F 1/133602* (2013.01); *G02F 1/134363* (2013.01); *G02F 1/136286* (2013.01); *G06F 3/044* (2013.01); *G06F 3/047* (2013.01); *G06F 3/0412* (2013.01); *G02F 2001/13629* (2013.01); *G02F 2001/133614* (2013.01); *G02F 2001/134372* (2013.01); *G02F 2001/136295* (2013.01); *G02F 2201/121* (2013.01); *G02F 2201/123* (2013.01)

(58) Field of Classification Search
CPC . G06T 2207/10024; G06F 2203/04112; G06F 2203/04103
See application file for complete search history.

(56) References Cited

U.S. PATENT DOCUMENTS

| | | | |
|---|---|---|---|
| 2011/0075061 A1* | 3/2011 | Yasukawa | G02F 1/13454 349/41 |
| 2011/0242469 A1* | 10/2011 | Kawamura | G02F 1/133512 349/138 |
| 2012/0257150 A1* | 10/2012 | Wu | G02F 1/136209 349/106 |
| 2012/0306797 A1 | 12/2012 | Misaki | |
| 2013/0083264 A1* | 4/2013 | Hagiwara | G02F 1/133707 349/42 |
| 2013/0182205 A1* | 7/2013 | Hibayashi | G02B 5/201 349/106 |
| 2014/0078104 A1 | 3/2014 | Lee et al. | |
| 2015/0338700 A1 | 11/2015 | Kimura et al. | |
| 2016/0034072 A1 | 2/2016 | Yang et al. | |

FOREIGN PATENT DOCUMENTS

| | | |
|---|---|---|
| JP | H07-036017 A | 2/1995 |
| JP | 2002-311227 A | 10/2002 |
| JP | 2009-540375 A | 11/2009 |
| JP | 2013-540331 A | 10/2013 |
| JP | 2013-242432 A | 12/2013 |
| JP | 2014-109904 A | 6/2014 |
| JP | 2014-149387 A | 8/2014 |
| TW | 201022761 | 6/2010 |
| TW | 201430447 | 8/2014 |
| WO | WO-2011/096123 A1 | 8/2011 |

OTHER PUBLICATIONS

Office Action issued in corresponding TW Patent Application No. 103132569 dated Oct. 17, 2017.
International Search Report issued in International Patent Application No. PCT/JP2014/073513 dated Nov. 25, 2014.

* cited by examiner

LIQUID CRYSTAL DISPLAY DEVICE AND DISPLAY DEVICE SUBSTRATE

CROSS-REFERENCE TO RELATED PATENT APPLICATION

This application is a continuation application filed under 35 U.S.C. § 111(a) claiming the benefit under 35 U.S.C. §§ 120 and 365(c) of International Application No. PCT/JP2014/073513, filed on Sep. 5, 2014, the entirety of which is hereby incorporated by reference.

TECHNICAL FIELD

The present invention relates to a liquid crystal display device provided with a low-resistive wiring pattern, improving visibility thereof, and capable of reducing noise produced by active elements. The present invention relates to an in-cell type liquid crystal display device in which an electrostatic capacitive type touch sensing function is integrated with the liquid crystal cell.

BACKGROUND

In a generally known configuration, a touch panel is provided on a surface of a display device included in portable equipment such as smartphones or tablet computers. The touch panel is used as an input means for detecting a contact between a finger or a pointer and the touch panel. To detect position of the finger or the pointer on the touch panel, a method of detecting a change in electrostatic capacitance is mainly used, in which the change in electrostatic capacitance is caused by a contact between the touch panel and a finger or a pointer.

However, with a configuration of a display device provided with a touch panel, the thickness or weight of the entire display device increases. Hence, in the configuration of such a display device, the touch panel may be an undesirable component. In this respect, an organic film has been mainly used for the touch panel in order to reduce the weight of the display device provided with a touch panel. Even with such a touch panel, it is difficult to avoid increase in the thickness of the entire display device. Further, the display device provided with the above-described touch panel and high definition pixels has a disadvantage that necessary input (e.g., pen-input) to the touch panel is difficult to achieve.

Specifically, when a display device has high definition pixels such as of 300 ppi (pixel per inch) or 400 ppi or more, the pixel pitch ranges around 10 μm to 30 μm. Thus, when display devices are provided with the above-described touch panel and high definition pixels, most of the touch panels cannot tolerate a pen-pressure. Further, it is difficult to achieve required resolution sufficiently suitable for a high-definition display device. Accordingly, touch sensing technique of the touch panel is required to be more sophisticated.

In recent years, development of a so-called in-cell type touch sensing technique is underway. In the technique, touch sensing function is provided to the inside of the liquid crystal cell or to the display device without using a touch panel (hereinafter referred to as in-cell display device).

A well-known configuration of the above-described display device includes a color filter substrate where a plurality of colored layers are regularly arranged, and an array substrate where active elements such as TFTs (thin film transistors) are internally arranged.

A prototype in-cell display device includes an in-cell structure in which a pair of touch sensing electrodes are provided either on a color filter substrate or an array substrate, or provided on both of the color filter substrate and the array substrate. According to the structure, a touch sensing function for detecting an input position of a finger or a pointer or the like can be accomplished by detecting a change in electrostatic capacitance produced between the touch sensing electrodes.

Liquid crystal display devices used for mobile devices, such as smartphones or tablet computers generally employ a method of using a fringe electric field produced between pixel electrodes and a common electrode to drive horizontally-aligned liquid crystal cells in a direction relative to the horizontal electric field. The method is referred to as an FFS (fringe field switching) or IPS (in-plane switching) method, and has a feature of securing a wider viewing angle than in a method of driving liquid crystal cells in the vertical electric field direction. Each of the pixel electrodes included in the array substrate of the liquid crystal display device is in a comb-teeth pattern or configured of a plurality of stripe patterns having slits. The common electrode is provided under the pixel electrodes.

Display devices or touch panels disclosed in PTLs 1 to 5, for example, are known as conventional display devices or touch panels.

CITATION LIST

Patent Literature

[PTL1] JP-A-H7-36017
[PTL2] JP-A-2013-540331
[PTL3] JP-A-2013-242432
[PTL4] JP-A-2014-109904
[PTL5] JP-A-2009-540375

SUMMARY OF THE INVENTION

Technical Problem

PTL1 discloses a configuration provided with an insulation substrate having a transparent conductive film as a counter electrode, a liquid crystal cells and an active element substrate, in which two pairs of electrodes are orthogonally crossed each other via an insulation film. The two pairs of electrodes are configured as shown in examples of FIG. 1, and used for pen input using electrostatic capacitance coupling method.

However, liquid crystal display devices using a transparent conductive film as a counter electrode generally have a problem of a narrow viewing angle, since most of such liquid crystal display devices are driven with vertical electric field. Taking the pixel electrode shape shown in FIG. 1 or 3 of PTL1 into consideration, the liquid crystal display device disclosed in PTL1 is assumed to be of a vertical electric field type. A critical factor inherent to PTL1, as described in paragraph [0020] is that the counter electrode unavoidably shields an input signal produced on the input surface where a pen-input is accepted. Hence, even when an electrode group used as a touch sensing operation is formed on an active element substrate (array substrate), sufficient sensitivity required for touch sensing is difficult to achieve. Moreover, PTL1 does not disclose a technique for reducing noise produced in the active elements due to incident light, such as external light, entering the device and light from the backlight unit. Since the touch sensing electrode made of metal, such as Al or Cr, reflects light emitted from the backlight unit, the light is likely to enter the active elements such as TFTs. The active elements, such as TFTs, are affected by incident light to cause a significant unfavorable impact to the display. PTL1 makes little mention of the unfavorable impact due to reflected light which is produced by the electrode group made of metal, such as Al or Cr.

PTL2 discloses a configuration in which a light absorption layer having low total reflectivity and a conductive layer are laminated, and further discloses a touch panel (e.g., claim 25 or the like of PTL2). However, PTL2 does not disclose an in-cell technique of incorporating a pair of touch sensing electrodes into a liquid crystal cell. Moreover, PTL2 fails to mention integration of the touch sensing electrode with the color filters. For example, paragraphs [0071] and [0096] and an experimental example in PTL2 exemplify aluminum as a material of a conductive pattern (or conductive layer). In a manufacturing process for red, green and blue pixels and a black matrix, photolithography method is used with an alkali development solution. However, the metal wiring made of aluminum is likely to be corroded by the alkali development solution so that the color filters are difficult to be formed. For example, according to claim 14 of PTL2, the total reflectivity is defined as 3% or less in a configuration provided with a light absorption layer on an opposite surface of a surface contacting the substrate. However, according to experimental examples 1 to 7, measurement wavelength of the total reflectivity is 550 nm. Also, FIGS. 11, 16 and 18 of PTL2 do not specifically disclose a configuration which accomplishes 3% or less total reflectivity in the light wavelength region that is the visible range of 400 nm to 700 nm. For example, in the reflectance shown in FIG. 18, large reflectance is exhibited in a blue region ranging from 400 nm to 500 nm so that the color of the light absorption layer is not observed as black but observed as blue, thereby lowering the visibility.

In claim 24 or the experimental example 3 of PTL2, copper (Cu) is disclosed as a metal for forming the conductive layer. However, in the case where glass such as non-alkali glass or a substrate of which the surface is made of resin is used as a base material, a problem arises that sufficient adhesion of the base material cannot be obtained to copper, copper oxide, or copper nitride oxide. For example, in the case where these materials are used for forming a copper film on the base material, and Cellotape (registered trade mark) is adhered to the copper film, followed by removing the Cellotape, there is a practical problem that the copper film is peeled off from the base material easily. In this regard, PTL2 does not disclose a specific technique to improve the adhesion in a configuration where a conductive layer containing copper is formed on the base material. PTL2 discloses a technique concerning an externally provided touch panel. PTL2 discloses an in-cell structure in which a touch sensing function is integrated in the display device. However, PTL2 does not suggest anything about reducing noise produced in the active elements due to external light entering the device from outside, or noise due to incident light entering the device from the backlight unit or reflected light.

PTL3 discloses a liquid crystal display device provided with an electrostatic capacitance type touch sensor, in which a first electrode is formed on a boundary region isolating pixel electrodes from each other, a second electrode is formed on a region facing the boundary region, and either one of the electrodes is permitted to serve as a drive electrode and the other electrode is permitted to serve as a detection electrode. Paragraph [0050] of PTL3 discloses forming a detection electrode using metal. However, PTL3 is silent about reducing noise produced on the active elements due to external light entering the device from outside, or noise due to incident light entering the device from the backlight unit or reflected light, in the configuration in which the detection electrode or the like is made of metal. In a configuration achieving high definition pixels of e.g., 300 ppi in a liquid crystal display, the line width of the black matrix becomes narrower to secure the aperture ratio of pixels. Thus, the display quality is significantly affected by incident light or reflected light entering the active elements. To achieve high definition in a display device, pixel size is reduced, accompanying which the luminance of the backlight unit becomes high. Specifically, it is necessary to prevent reflected light from entering the active elements, the reflected light being reflected at the detection electrode or the drive electrode which is made of metal, and to prevent the semiconductor layer used for a channel layer of the active elements from being exposed to the pixel opening.

For example, as shown in FIG. 7 of PTL3, right end portion of the TFT 46 is configured such that the right end portion is exposed to external light or incident light entering the device from the backlight unit and that oblique light enters the semiconductor 48 serving as a channel portion. Such a configuration may affect a display quality. PTL3 discloses use of an IPS method in the embodiment. According to liquid crystal driving methods such as an IPS method or an FFS method, in which the liquid crystal molecules horizontally rotate on the substrate surface, rotation of the liquid crystal molecules propagates for a long distance. Accordingly, when the drive voltage is applied to the liquid crystal layer, rotation of the liquid crystal molecules influence adjacent pixels which are not applied with the drive voltage, so that light leakage occurs at an end portion of the adjacent pixels. Therefore, according to liquid crystal display using the IPS or FFS method, there is a concern that color mixing problem may easily occur in which adjacent pixel colors are mixed with the color of the pixel to be driven. In particular, the occurrence of color mixing in a high-definition liquid crystal display such as of 300 ppi or more is a serious problem. A configuration disclosed in paragraph [0057] of PTL3, in which color filters are formed after the black matrix is formed on the glass substrate, is unlikely to solve such a color mixing problem.

PTL4 discloses a technique of forming a drive electrode along a direction in which the signal line for driving TFT is extended, by using metal wiring or the like. The major portion of PTL4 is similar to PTL3. The technique disclosed in PTL4 makes no mention of reducing noise in a configuration in which a touch sensing electrode or a drive electrode or the like is formed of metal wiring, the noise being produced at active elements due to external light or incident light entering the device from the backlight unit or reflected light. In a configuration achieving high definition pixels of e.g., 300 ppi in a liquid crystal display, the line width of the black matrix becomes narrower to secure the aperture ratio. Thus, the display quality is significantly affected by incident light or reflected light entering the active elements. To achieve high definition in a display device, pixel size is reduced, accompanying which the luminance of the backlight unit becomes high. In particular, PTL4 fails to mention degradation of image quality due to reflected light entering the active elements, the reflected light being reflected at the detection electrode or the drive electrode which is made of metal.

PTL4 discloses various embodiments which are presumed to be liquid crystal driving using the FFS or IPS method. For example, the drive electrode COML shown in FIGS. 20, 21 and 22 serves as a common electrode of the liquid crystal display device and as a drive electrode of the touch sensing as disclosed in paragraph [0051]. However, the configuration disclosed in PTL4 includes several noise sources which produce noise in touch sensing. The noise sources include a pixel signal line SGL, a scan signal line GCL, a pixel electrode 22 and the like, which are disposed between the detection electrode TDL and the drive electrode COML in a thickness direction. Hence, this configuration is not favorably used. In addition, there is a concern that a somewhat thick glass substrate 31 provided between the detection electrode TDL and the drive electrode COML, as shown in FIGS. 9, 20 to 22 and 23 of PTL4, may lower the electrostatic capacitance between the detection electrode TDL and the drive electrode COML for touch sensing. Hence, such a configuration is likely to pick up parasitic noise so that the touch sensing accuracy is lowered when detectable electrostatic capacitance is small.

The first embodiment of PTL4 corresponding to FIG. 9 discloses, as described in paragraph [0045], a liquid crystal layer 6 driven by a VA method (Vertical Alignment) and an ECB method (Electrically Controlled Birefringence). Further, the counter electrode 3 is provided with the drive electrode COML. It is considered that PTL4 discloses a liquid crystal display device using vertical electric field, instead of horizontal electric field method such as FFS or IPS method. As described, a vertical electric field type liquid crystal display device using VA or ECB method has low oblique visibility compared to a liquid crystal display device using a horizontal electric field method such as FFS or IPS. Further, PTL4 does not propose a configuration for improving visibility, in which metal wiring such as a drive electrode COML is sandwiched by a black layer and a black matrix.

PTL5 proposes, as recited in claims 1 to 3, 33, 45 and 60 or the like, a configuration in which at least one touch sensing element is disposed on a surface of the first substrate of the TFT plate, facing the second substrate. Claim 4 of PTL5 recites a configuration in which a plurality of metal touch sensing electrodes is arranged on a backside of the black matrix.

However, PTL5 does not disclose optimization of the liquid crystal display device, and especially does not disclose transmittance of the device. Moreover, PTL5 does not disclose a technique related to noise reduction during a touch sensing operation or improvement of visibility when an observer views the liquid crystal display device.

Further, concerning a plurality of metal touch sensing electrodes arranged on a backside of the black matrix, PTL5 does not disclose in detail the black matrix pattern and the metal touch sensing electrodes. According to FIGS. 57 and 72 of PTL5, it can be presumed that sizes of the pattern are different between the black matrix and a metal pattern or the like designated by a reference sign M1. PTL5 does not disclose a technique of forming the black matrix pattern and the metal pattern into the same size. For example, PTL5 fails to disclose a specific technique to produce a high-definition display device having pixels of 300 ppi or more.

PTL5 makes little mention of a method for holding electrostatic capacitance between a metal pattern or the like designated by a reference sign M1 and a counter electrode such as of ITO used for touch sensing, or a specific measure to reduce noise or improve the S/N ratio during touch sensing operation. According to the configuration shown in FIG. 36, PTL5 makes no mention of techniques of improving visibility including a technique of preventing light reflected at ITO or metal BM from entering the eyes of an observer, and a technique of lowering the reflectance of the black matrix shown in FIG. 57 to achieve low reflectance. Also, reflected light reflected at a liquid crystal designated by a reference sign M shown in FIG. 57 (re-reflection in liquid crystal cell) is not mentioned. As shown in FIGS. 57 and 58, the line width of the black matrix is larger than the line width of M1 (metal 1). In contrast, a normal photolithography process is required to tolerate an alignment accuracy of around ±2 µm. Hence, it is generally difficult to form the black matrix and M1 with the same line width.

Paragraph [0150] of PTL5 discloses a display-frame update rate of 60 fps and a touch scanning rate of 120 fps. However, a touch-sensing scanning performed at a touch scanning rate of 120 fps is included twice in a display-frame updating rate of 60 fps (120 fps is twice of 60 fps). Hence, noise due to display operation is picked up at the timing of updating the display frame on a 60 fps basis. It is not preferable to use a touch scanning rate having an integer multiple of the display-frame updating rate which is likely to pick up noise. The configurations disclosed in PTL5 have problems from viewpoints of transmittance in a liquid crystal display device, visibility to the observer, noise reduction during touch sensing operation, and S/N ratio.

Next, another problem which is likely to occur in a liquid crystal display device using an FFS method will be described. FIG. 17 is a cross-sectional view schematically showing a liquid crystal display device using an FFS method. In the liquid crystal display device using an FFS method as shown in FIG. 17, a pixel electrode 21 having a comb-like shape and a common electrode 22 are formed, as electrodes for use in liquid crystal driving, on an array substrate 200, usually, via an insulation film. Each pixel electrode 21 and the common electrode 12 are transparent electrodes formed of a material referred to as ITO (Indium Tin Oxide), in order to maintain the aperture ratio of the pixels. The liquid crystal molecules of a liquid crystal layer 30 are driven by fringe electric field produced between the pixel electrode 21 and the common electrode 22. An insulation layer 6 is provided between the liquid crystal layer and a color filter 16. In the display device substrate 100 provided with such a configuration, as shown in FIG. 17, equipotential lines 42 formed between the pixel electrode 21 and the common electrode 22 extend in an approximately vertical direction with respect to the surface of the display device substrate, since the color filter 16 and the like are each formed of an insulator. When the shape of the equipotential lines 42 are not distorted, liquid crystal molecules aligned horizontally on the substrate surface of the liquid crystal layer 30 rotate in parallel and uniformly with respect to the direction (horizontal direction) perpendicular to the thickness direction of the liquid crystal layer 30, whereby high transmittance can be secured.

FIG. 18 is a cross-sectional view schematically showing a liquid crystal display device using an FFS method, in which a color filter 16 is provided on a transparent substrate 10, an insulation layer 6 is provided on the color filter 16, a transparent electrode 17 is provided on the insulation layer 6, and a liquid crystal layer 30 is located on the transparent electrode 17, for example.

FIG. 19 is a cross-sectional view schematically showing a liquid crystal display device using an FFS method, in which a transparent electrode 17 is provided on a transparent substrate 10, a color filter 16 is provided on the transparent electrode 17, an insulation layer 6 is provided on the color filter 16, and a liquid crystal layer 30 is located on the insulation layer 6, for example.

FIGS. 18 and 19 show a state where the equipotential lines are enclosed within a liquid crystal display device by the transparent electrode 17 which is a conductive film. In particular, in FIG. 18, the transparent electrode 17 is provided at a location adjacent to the liquid crystal layer 30 so that the equipotential lines are distorted in the liquid crystal layer 30. Hence, the change in behavior or alignment of the liquid crystal molecules becomes non-uniform. As a result, the liquid crystal molecules in the liquid crystal layer 30 are not aligned in the same direction so that light-transmittance is significantly lowered.

As shown in FIG. 7 or 8 of PTL3, the detection electrode 36 is disposed on an outer side far from the liquid crystal layer 60. This is because, if the detection electrode 36 as a conductor is disposed close to the liquid crystal layer 60, the detection electrode 36 is more likely to adversely affect the transmittance of the liquid crystal display device.

Since a video signal is continuously transmitted to the active element (TFT) through the signal line (source wiring) of the active element during the display operation, noise is necessarily produced around the source wiring, accompanying the transmission of the video signal. For example, according to FIGS. 3 to 6 of PTL3, a wiring of the drive electrode 48 or the detection electrode is arranged in a mesh matrix pattern overlapping with the video signal line Px. The structure having a pattern shape overlapping with the video signal line Px is likely to pick up noise.

It should be noted that a sentence "can be performed in a time-sharing manner" is found in paragraph [0033] of PTL3. For touch sensing driving, high speed driving is preferably performed regardless of the liquid crystal driving frequency, with a frequency higher than the liquid crystal drive.

In the active elements (TFTs), light has to be prevented from entering a channel portion of each active element, or off leak current has to be reduced. This is because, due to incident light or off leak current, drive signal may leak into pixels which are not driven, causing cross-talk or a flickering or the like, whereby a display quality is likely to be lowered. In the case of a display device having high definition pixels, such as of 300 ppi (pixel per inch) or 400 ppi or more, the line width of the black matrix or the line width of the wiring connected to the active element is required to be made smaller. Therefore, a countermeasure has to be necessarily taken to avoid entry of light into the TFT, increase of the wiring resistance, and lowering of image quality, which are caused by the reduction in the line width of the black matrix or the wiring connection of the active element.

PTLs 3 and 4 make little mention of taking countermeasures to solve problems caused by the need of high definition pixels.

The present invention has been achieved in light of the above-described problems, and provides a liquid crystal display device and a display device substrate, which hardly pick up noise, and can reduce color mixing problem of adjacent pixel colors being mixed with the color of pixels to be driven, secure transmittance or display quality of the liquid crystal display, and achieve high definition pixels of 300 ppi or more.

Solution to Problem

A liquid crystal display device according to a first aspect of the present invention includes: a counter substrate including a first transparent substrate having a display region and a terminal region located outside the display region, and a first wiring layer having a laminate structure of a black layer and a first metal layer, the first wiring layer being disposed on a first surface of the first transparent substrate; a liquid crystal layer; and an array substrate including a second transparent substrate, an active element disposed on the second transparent substrate and having a transistor structure including a gate electrode, and a second wiring layer orthogonally crossing the first wiring layer, the array substrate being bonded to the first surface of the first transparent substrate via the liquid crystal layer.

In the liquid crystal display device according to the first aspect of the present invention, the terminal region is provided with a plurality of terminal portions each having the laminate structure of the black layer and the first metal layer; the counter substrate is provided with the first wiring layer, a black matrix having a plurality of openings formed in the display region, and a first transparent resin layer covering the black matrix, laminated on the first surface in this order; the black matrix has a line width larger than a line width of the first wiring layer and overlaps with the first wiring layer so as to include a pattern of the first wiring layer in plan view; the second wiring layer is formed of a second metal layer and has a light shielding pattern formed of the second metal layer; the active element is covered with the light shielding pattern via a first insulation layer provided on the active element; and a change in electrostatic capacitance produced between the first wiring layer and the second wiring layer is detected, thereby performing a touch sensing operation.

In the liquid crystal display device according to the first aspect of the present invention, the opening has a long side and a short side; and the second wiring layer may be provided in parallel to the short side of the opening in plan view.

In the liquid crystal display device according to the first aspect of the present invention, the array substrate may have a gate wiring electrically connected to the gate electrode; and the second wiring layer may be provided on the first insulation layer, extending in parallel to the gate wiring in plan view.

In the liquid crystal display device according to the first aspect of the present invention, the second wiring layer may have a constant electric potential.

In the liquid crystal display device according to the first aspect of the present invention, a color filter layer may be provided between the first metal layer and the first transparent resin layer.

In the liquid crystal display device according to the first aspect of the present invention, the first transparent resin layer may be provided between the black matrix and the liquid crystal layer.

In the liquid crystal display device according to the first aspect of the present invention, the black matrix may have a relative dielectric constant in a range from 3.0 to 4.4.

In the liquid crystal display device according to the first aspect of the present invention, the active element may be provided with a channel layer containing two or more types of metal oxides composed of oxides selected from gallium, indium, zinc, tin and germanium.

In the liquid crystal display device according to the first aspect of the present invention, the array substrate may include a pixel electrode, a common electrode provided between the pixel electrode and the second transparent substrate, and a second insulation layer provided between the pixel electrode and the common electrode; the active element may be electrically connected to the pixel electrode; and the liquid crystal layer may be driven by voltage applied between the pixel electrode and the common electrode.

In the liquid crystal display device according to the first aspect of the present invention, the liquid crystal layer may have an initial alignment in parallel to a surface of the second transparent substrate.

A display device substrate according to a second aspect of the present invention includes: a transparent substrate having a first surface, a second surface opposite to the first surface, a display region and a terminal region provided on the first surface and located outside the display region; a wiring layer provided on the first surface, having a laminate structure of a black layer and a metal layer, a width of the black layer and a width of the metal layer being equal; a plurality of terminal portions provided on the terminal region, having the laminate structure of the black layer and the metal layer; and a black matrix provided to cover the wiring layer, having a plurality of openings formed in the display region, and having a line width larger than that of the wiring layer, overlapping the wiring layer so as to include a pattern of the wiring layer in the display region in plan view; and a first transparent resin layer covering the black matrix.

In the display device substrate according to the second aspect of the present invention, a second transparent resin layer may be provided between the metal layer and the black matrix.

A display device substrate according to a third aspect of the present invention includes: a transparent substrate having a first surface, a second surface opposite to the first surface, a display region and a terminal region provided on the first surface and located outside the display region; a wiring layer provided on the first surface, having a laminate structure of a black layer and a metal layer, a width of the black layer and a width of the metal layer being equal; a plurality of terminal portions provided on the terminal region, having the laminate structure of the black layer and the metal layer; and a black matrix provided to cover the wiring layer, having a plurality of openings formed in the display region, and having a line width larger than that of the wiring layer, overlapping the wiring layer so as to include a pattern of the wiring layer in the display region in plan view; a color filter layer disposed between the metal layer and the black matrix in the display region; and a first transparent resin layer covering the black matrix.

In the display device substrate according to the third aspect of the present invention, a second transparent resin layer may be provided between the color filter layer and the black matrix.

In the display device substrate according to the second aspect and the third aspect, a relative dielectric constant of the black matrix may range from 3.0 to 4.4.

Advantageous Effects of Invention

According to the above-described aspects of the present invention, a liquid crystal display device can be provided in which a component having a thickness of such a touch panel is not used, a black layer is included, high visibility is obtained, high definition display of 300 ppi or more is possible, and precise touch sensing function is provided. Further, according to the above-described aspect of the present invention, a display device substrate having high visibility can be provided, which is used for a display device having a precise touch sensing function.

Further, according to the above-described aspects of the present invention, a display device substrate provided with a color filter layer, having high visibility can be provided, which is used for a display device having a precise touch sensing function. In addition, according to the above-described aspects of the present invention, a distance between the first wiring layer and the second wiring layer corresponds to a total thickness of a thickness of the liquid crystal layer and a thickness of insulators provided in the liquid crystal cell, which is smaller than that of conventional liquid crystal display devices. Hence, sufficient electrostatic capacitance can be secured. Since each of the first wiring layer and the second wiring layer according to the above-described aspects of the present invention has a liner shape, electrical noise is less likely to be picked up compared to a bending pattern or a mesh-shaped pattern so that a S/N ratio can be improved.

DESCRIPTION OF REPRESENTATIVE EMBODIMENTS

Figure 1:
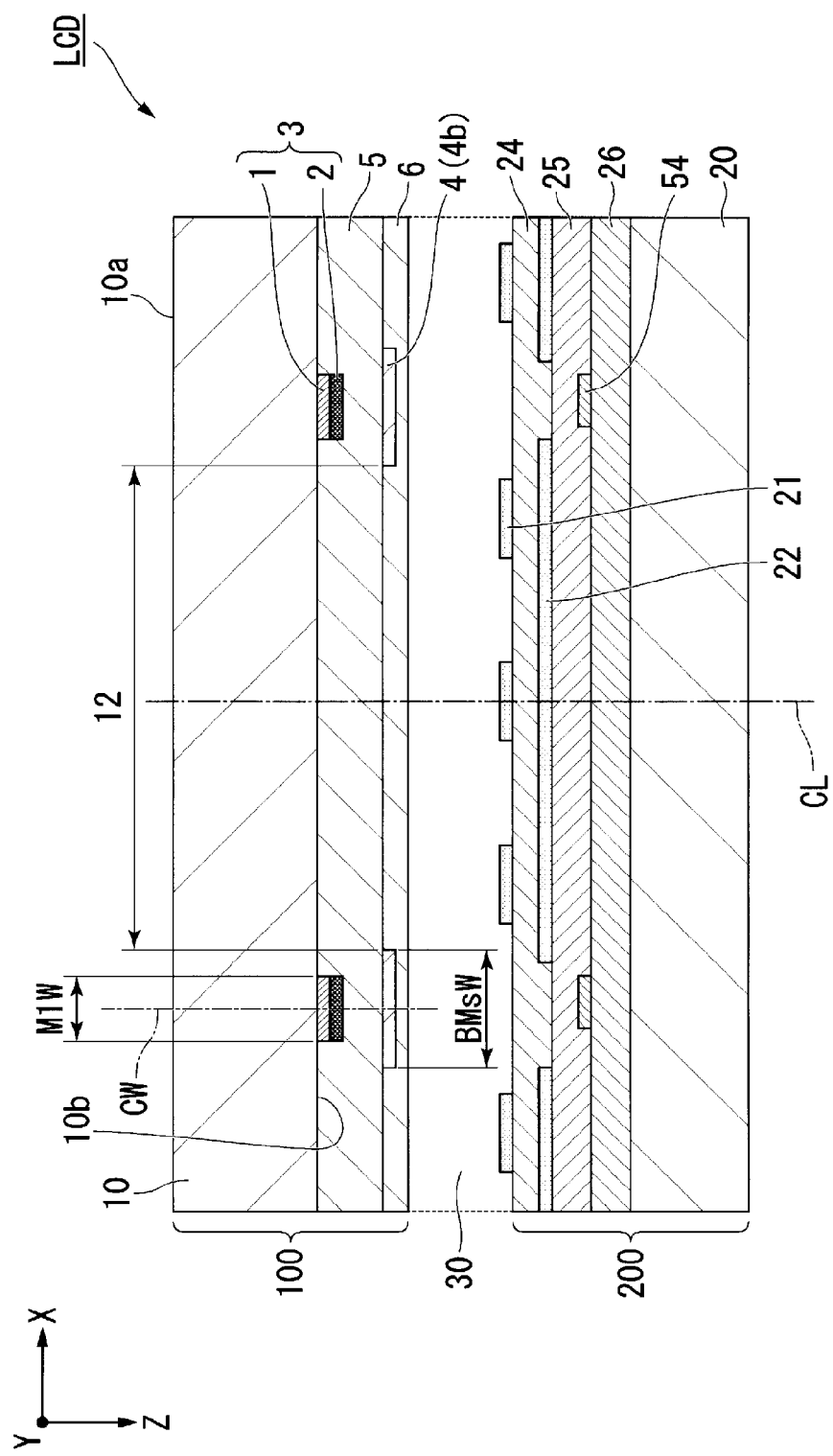
FIG. 1 is a cross-sectional view showing a part of a liquid crystal display device according to a first embodiment of the present invention, taken along A-A' line of FIG. 7.

Hereinafter, with reference to the drawings, embodiments of the present invention will be described.

In the following description, the same reference signs are designated to elements having the same or substantially the same functions to omit description of the elements or describe the elements as needed.

In the drawings, dimensions and ratios of elements are appropriately made different from those of actual elements, in order for the respective elements to be recognized on the drawings.

In the embodiments, only characteristics portions will be described, omitting description on portions of the display device according to the present embodiments which are not different from the elements in an ordinary display device. The embodiments will each be described by way of an example of a liquid crystal display device or a display device substrate. The display device substrates according to the present embodiments can also be applied to a display device such as an organic EL display device, besides the liquid crystal display device.

In the following description, both of or either one of a first wiring layer and a second wiring layer used for touch sensing may be referred to as a touch sensing electrode.

First Embodiment

With reference to FIGS. 1 to 9, a liquid crystal display device according to a first embodiment will be described. A liquid crystal display device described in the present embodiment is provided with a display device substrate according to an embodiment of the present invention. It should be noted that 'plan view' mentioned in the following description refers to a plane as viewed from a direction of an observer's observing a display surface (plane of display device substrate) of the liquid crystal display device. A shape of the display portion or a shape of the opening defining a pixel of the liquid crystal display device according to the embodiment of the present invention, and the number of pixels composing the liquid crystal display device are not limited. However, in the embodiment specifically described below, the liquid crystal display device will be described, defining, in plan view, a short side direction of the pixel as an X-direction, a long side direction of the pixel as a Y-direction, and a thickness direction of the transparent substrate as a Z-direction. The above-defined X- and Y-directions can be switched to configure the liquid crystal display device.

FIG. 1 is a cross-sectional view partially showing a liquid crystal display device LCD according to the present embodiment.

The liquid crystal display device LCD according to the first embodiment of the present invention is provided with a display device substrate 100 (counter substrate), an array substrate 200 bonded to the display device substrate 100 to face each other, and a liquid crystal layer 30 sandwiched and held between the display device substrate 100 and the array substrate 200. A backlight unit which supplies light to the inside of the liquid crystal display device LCD is disposed on the back surface of the array substrate 200 (surface opposite to a surface of the array substrate 200 where the liquid crystal layer 30 is provided) included in the liquid crystal display device LCD. It should be noted that the backlight unit may be arranged at a side surface of the liquid crystal display device LCD. In this case, for example, a reflector, a light guide plate, a light diffusion board or the like is arranged on the back surface of the array substrate 200. The reflector reflects light emitted from the backlight unit towards inside the liquid crystal display device LCD.

In FIG. 1, an alignment film imparting initial alignment to the liquid crystal layer 30, an optical film such as a polarizing film, a protective cover glass, or the like are omitted.

(Display Device Substrate)

As shown in FIG. 1, the display device substrate 100 (counter substrate) is provided with a transparent substrate 10 (first transparent substrate) having a first surface 10b and a second surface 10a opposite to the first surface 10b. The second surface 10a is exposed towards outside the liquid crystal display device LCD, serving as an input surface of touch sensing function. The first surface 10b faces the array substrate 200. The display device substrate 100 is provided with a first wiring layer 3 formed on the first surface 10b of the transparent substrate 10, a transparent resin layer 5 (second transparent layer) formed on the transparent substrate 10 to cover the first wiring layer 3, a black matrix 4 formed on the transparent resin layer 5, and a transparent resin layer 6 (first transparent resin layer) formed on the transparent resin layer 5 to cover the black matrix 4. In other words, the transparent resin layer 6 is provided between the black matrix 4 and the liquid crystal layer 30. In other words, the display device substrate 100 is provided with the first wiring layer 3, the black matrix 4 and the transparent resin layer 6, which are laminated on the first surface 10b in this order. The transparent resin layer 5 is provided between a first metal layer 2 and the black matrix 4.

Figure 2:
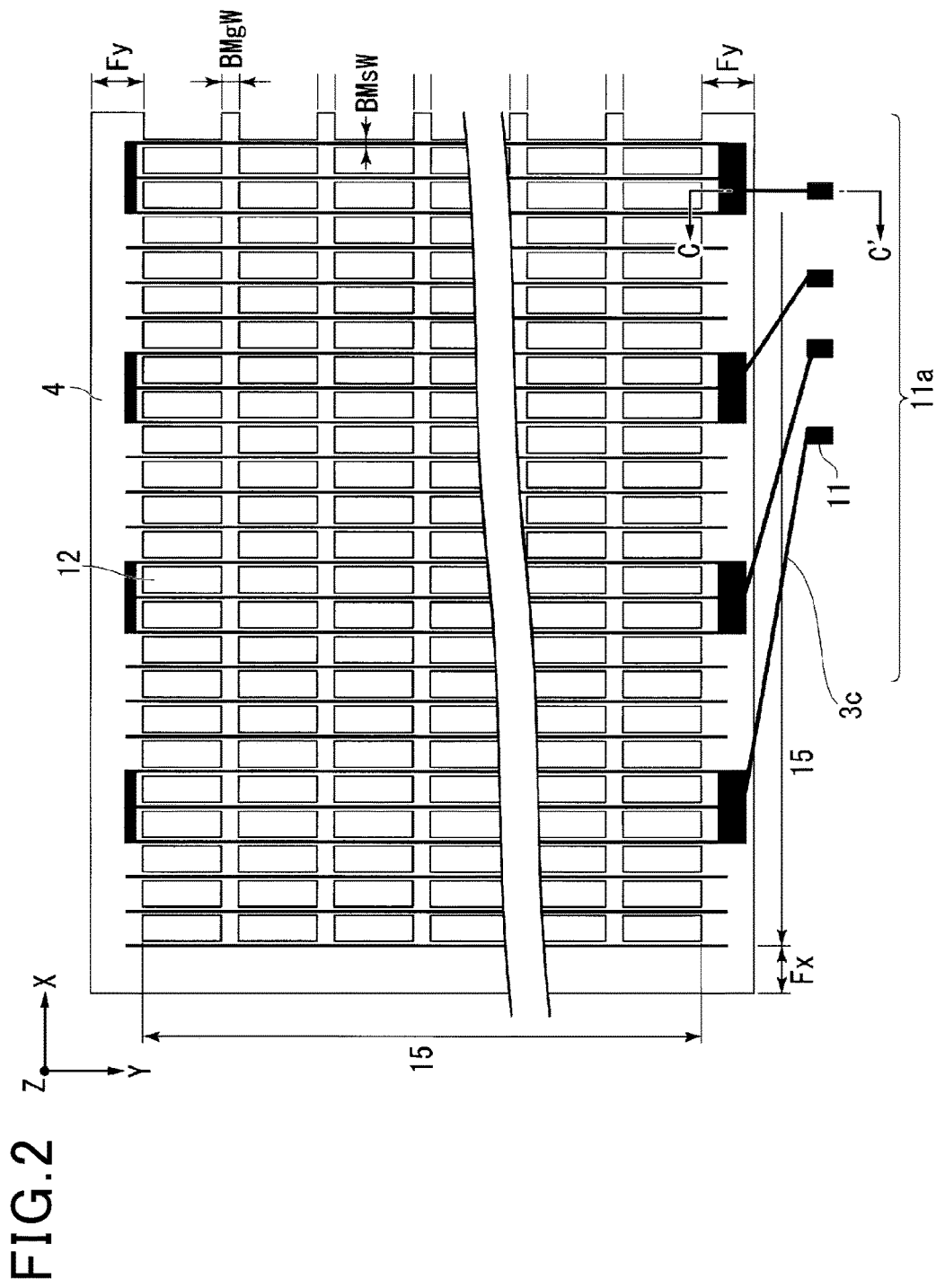
FIG. 2 is a plan view showing a transparent substrate of a display device substrate included in the liquid crystal display device according to the first embodiment of the present invention.

The first wiring layer 3 (wiring layer) has a laminate structure composed of a black layer 1 formed on the first surface 10b of the transparent substrate 10, and the first metal layer 2 (conductive layer, metal layer) formed on the black layer 1. As shown in FIG. 1 or 2, in the line width of the first wiring layer 3, the line widths can be the same between the first black layer 1 and the first metal layer 2 as the components of the first wiring layer 3. The line widths of the black layer 1 and the first metal layer 2 may be different from each other. For example, the line width of the black layer 1 may be larger than the line width of the first metal layer 2. In order to improve the opening ratio of the pixel, the line widths of the black layer 1 and the first metal layer 2 are preferably be the same. The first metal layer 2 can be formed of one or more layers of thin metal films. According to the configuration in which the first metal layer 2 is formed of thin metal films, light is prevented from entering the active element 51 (will be described later).

As shown in FIG. 2, the transparent substrate 10 is provided with an effective display region 15 (display region), a terminal region 11a provided on the first surface 10b, while being located outside the effective display region 15, and frame regions Fx and Fy. The terminal region 11a is provided with a plurality of terminal portions 11 which will be described later.

As shown in FIG. 2, the frame regions Fx and Fy are provided on the first surface 10b of the transparent substrate 10 to surround the effective display region 15. The frame regions Fx and Fy may be arranged with a light shielding thin film pattern so as to completely shield light emitted from the backlight unit. In the case where such a light shielding thin film layer is formed in the frame regions Fx and Fy, the light shielding thin film pattern is formed in the frame regions Fx and Fy using, for example, the same metal layer as used to form the first metal layer 2 or a light shielding layer 59 (described layer) so as to be electrically isolated from the first metal layer 2.

The black matrix 4 with a plurality of opening regions 12 formed therein is provided in the effective display region 15.

Figure 3:
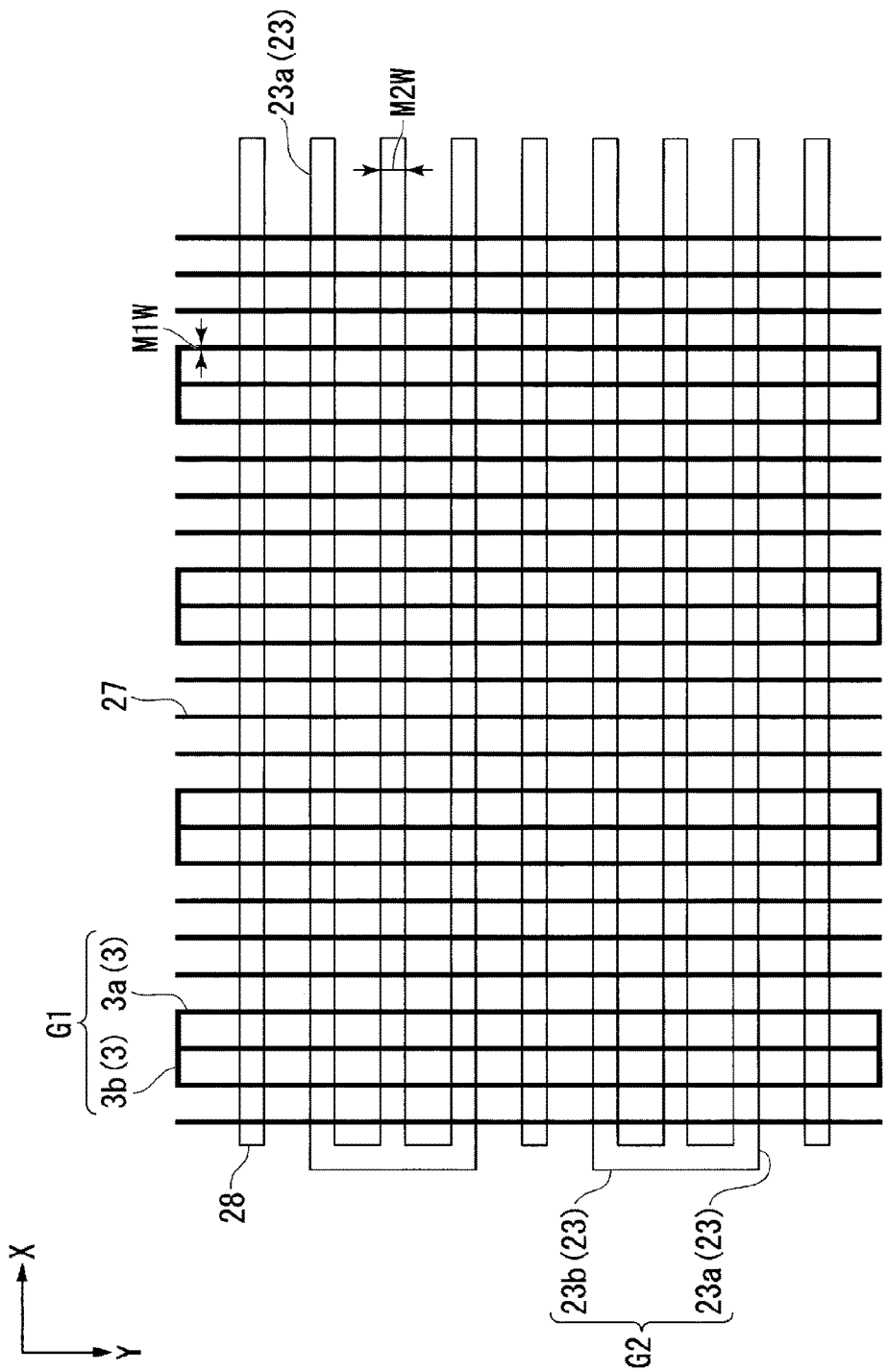
FIG. 3 is a plan view showing an example of a first wiring layer and a second wiring layer included in a liquid crystal display device according to the first embodiment of the present invention.

With reference to FIGS. 2 and 3, the first wiring layer 3 arranged on the display device substrate 100 and a second wiring layer 23 (described later) arranged on the array substrate 200 will be described. In FIG. 3, in order to clarify a positional relationship between the first wiring layer 3 and the second wiring layer 23, only the first wiring layer 3 and the second wiring layer 23 are extracted and illustrated.

The first wiring layer 3 arranged on the display device substrate 100 orthogonally crosses the second wiring layer 23 (described later) arranged on the array substrate 200, in plan view. The first wiring layer 3 and the second wiring layer 23 serve as touch sensing electrodes for detecting a pointer such as a finger approaching the second surface 10a of the display device substrate 100 from outside the liquid crystal display device LCD.

In an example shown in FIG. 3, three first wirings 3a are electrically connected to each other by a connection wiring 3b (3). The connection wiring 3b extends in the X-direction. The first wirings 3a extend in the Y-direction. The connection wiring 3b and the three first wirings 3a form a first wiring group G1. As shown in FIG. 2, each first wiring group G1 is electrically connected to one terminal portion 11 via a wiring 3c. Also, a plurality of first wiring groups G1 are provided on the first surface 10b of the transparent substrate 10 at regular intervals in the X-direction. Further, a plurality of terminal portions 11 corresponding to the number of first wiring groups G1 are arranged in the terminal region 11a along the X-direction at regular intervals.

The display device substrate 100 includes a floating pattern 27 which extends in the Y-direction in parallel to the first wirings 3a. The floating pattern 27 is simultaneously formed on the transparent substrate 10 when the first wiring layer 3 is formed, the floating pattern 27 having the same laminate structure as the first wiring layer 3. The floating pattern 27 is an electrically floating conductive pattern and is not electrically connected to the first wiring layer 3.

In the example shown in FIG. 3, three second wirings 23a are electrically connected to each other by a connection wiring 23b (23). The connection wiring 23b extends in the Y-direction. The second wirings 23a extend in the X-direction. The connection wiring 23b and the three second wirings 3a form a second wiring group G2. Each second wiring group G2 is connected to a terminal provided on the array substrate 200. A plurality of terminal portions corresponding to the number of second wiring groups G2 are arranged on the array substrate 200. This configuration enables a touch sensing control unit 122 (described later) to detect a detection signal outputted from the second wiring group G2, or to supply a drive signal to the second wiring group G2 via the terminal portion.

Also, the array substrate 200 is provided with a floating pattern 28 extending in the X-direction in parallel to the second wirings 23a. The floating pattern 28 is simultaneously formed on a transparent substrate 20 when the second wiring layer 23 is formed, the floating pattern 28 having the same structure as the second wiring layer 23. The floating pattern 28 is an electrically floating conductive pattern, and is not electrically connected to the second wiring layer 23.

The plurality of first wirings 3a (3) forming the first wiring layer 3 and the second wirings 23a (23) forming the second wiring layer 23 cross each other at a plurality of crossing points. When a pointer approaches any of the plurality of crossing points, there is a change in the electrostatic capacitance produced between the first wiring 3a and the second wiring 23a at the crossing point. Touch sensing driving is performed by detecting such a change in electrostatic capacitance (described later).

In the case where the first wiring layer 3 serves as a drive electrode in touch sensing driving, a line width M2W of the second wiring layer 23 (second wiring 23a) is designed to be larger, as shown in FIG. 3, than a line width M1W of the first wiring layer 3 (first wiring 3a), thereby increasing fringe capacitance (electrostatic capacitance) produced between the first wiring layer 3 and the second wiring layer 23. Further, the second wiring layer 23 can be formed on a gate wiring 52 (described later), thereby increasing the width of the second wiring layer 23.

Figure 4:
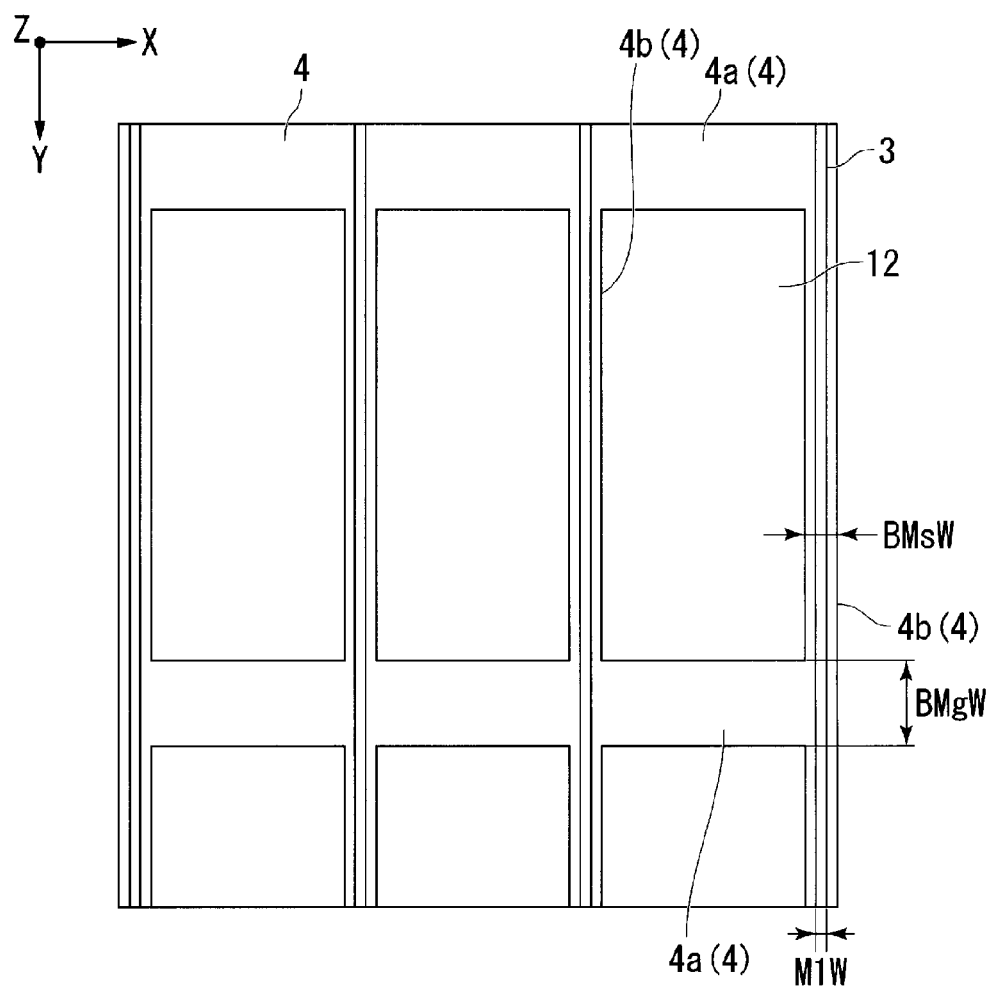
FIG. 4 is a plan view showing a part of a display device substrate of the liquid crystal display device according to the first embodiment of the present invention, which is partial enlargement of the plan view of the liquid crystal display device shown in FIG. 1, showing a relationship between a black matrix and a first wiring layer.

In plan view, the first wiring layer 3 and the second wiring layer 23 are preferably covered with the black matrix 4. That is, the line widths of the first wiring layer 3 and the second wiring layer 23 are preferably smaller than the line width of the black matrix 4. Specifically, as shown in FIGS. 2 to 4, a line width BMsW of the black matrix 4 (second light shielding portion 4b) is larger than the line width M1W of the first wiring layer 3, and a line width BMgW of the black matrix 4 (first light shielding portion 4a) is larger than the line width M2W of the second wiring layer 23 (second wiring 23a). In other words, in plan view, the black matrix 4 overlaps the first wiring layer 3 so as to include the pattern (first wiring pattern) of the first wiring layer 3.

The line widths are defined in this way for the reasons of preventing entry of reflected light from the first wiring layer 3 or the second wiring layer 23 into the observer's eyes or a channel layer 50 of the active element 51, in the case where both of the first wiring layer 3 and the second wiring layer 23 are formed of thin metal films or the like. Since the thin metal line (first metal layer 2) having high light reflectivity is sandwiched between the black layer 1 and the black matrix 4, visibility or display image quality of the liquid crystal display can be significantly improved.

The embodiment of the present invention should not be construed as limiting the following matters, including the number of first wirings 3a composing the first wiring layer 3, the number of second wirings 23a composting the second wiring layer 23, the number of groups each including a plurality of first wirings 3a (for example, mutually electrically connected three first wirings 3a are grouped to form one group, and a plurality of such groups are provided), the number of groups each including a plurality of second wiring 23a (for example, mutually electrically connected three first wirings 3a are grouped to form one group, and a plurality of such groups are provided), a method of forming such wiring layer groups, a method of driving, such as thinned out driving (driving of selected wirings without driving all of the driving layers), the width of the first wiring 3a, the width of the second wiring 23a, the number of floating patterns 27, 28, and the width of the floating patterns 27 and 28.

For example, 6 wirings out of 18 first wirings 3a composing the first wiring layer 3 excepting 12 first wirings 3a (no signal is applied to or detected for the 12 first wirings 3a) may be defined as one wiring group to form a plurality of groups (grouping) accordingly. Alternatively, 6 wirings out of 18 second wirings 23a composing the second wiring layer 23a excepting 12 second wirings 23a (no signal is applied to or detected for the 12 second wirings 23a) may be defined as one wiring group to form a plurality of groups (grouping) accordingly. In this case, grouped first wirings 3a and second wirings 23a can be used to perform touch sensing driving or detect a drive signal, thereby increasing the speed of touch sensing operation. FIG. 3 shows a configuration example in which three first wirings 3a form one group and three second wirings 23a form one group.

FIG. 4 is a partially enlarged plan view of the display device substrate 100 shown in FIG. 2 to describe a relationship between the black matrix 4 and the first wiring layer 3. FIG. 4 shows a pixel configuration of the display device substrate 100 to be bonded to the array substrate 200.

The black matrix 4 is provided with a first light shielding portion 4a extending in the X-direction and a second light shielding portion 4b extending in the Y-direction. The first light shielding portion 4a and the second light shielding portion 4b cross each other. The black matrix 4 is provided with an opening 12 surrounded by the first and second light shielding portions 4a and 4b. The first light shielding portion 4a forms a short side of the opening 12 and the second light shielding portion 4b forms a long side of the opening 12.

According to the example shown in FIG. 4, the length of the opening 12 in the Y-direction (long side) is longer than the length thereof in the X-direction (short side). However, the length of the opening 12 in the X-direction may be longer than the length thereof in the Y-direction. In the black matrix 4, a plurality of openings are formed, the number of which corresponds to the number of plurality of pixels which compose the display surface of the liquid crystal display device LCD. The plurality of openings 12 are arranged along the X-direction and the Y-direction in the effective display region 15. In other words, the openings 12 are provided in a matrix pattern.

The first light shielding portion 4a extends to overlap a gate wiring 52 (described later) in plan view, and has a line width BMgW (width in the Y-direction). The second light shielding portion 4b extends to overlap a source wiring 54 (described later), and has a line width BMsW (width in the X-direction).

As shown in FIGS. 1 and 4, the second light shielding portion 4b of the black matrix 4 overlaps the first wiring layer 3 in plan view, and the line width BMsW of the second light shielding portion 4b is larger than the line width M1W of the first wiring layer 3. It should be noted that the center position in the line width M1W of the first wiring layer 3 and the center position of the line width BMsW of the second light shielding portion 4b of the black matrix 4 coincide with the central line CW. As shown in FIG. 1, the first wiring layer 3 and the second light shielding portion 4b are provided in a side edge portion (e.g., location overlapping the source wiring 54), being arranged in a line symmetrical manner with respect to the pixel center CL of a pixel.

Materials that can be used for the first metal layer 2 forming the first wiring layer 3 include copper, silver, gold, molybdenum and aluminum, or alloys containing these metals. Since nickel is ferromagnetic, film-forming rate is low in a process of forming the first metal layer 2 using nickel. As a method of forming the first metal layer 2 using nickel, vacuum film deposition such as sputtering can be used. In a manufacturing process of the display device substrate 100 or the like, the first metal layer 2 can be formed using aluminum or an aluminum alloy, when the color filter is not formed. Chromium, having disadvantages such as environmental pollution or a large resistance, can be used for an underlayer film of the first metal layer 2 to improve adhesion. To improve adhesion, metal oxide containing indium oxide can be used as an underlayer or a surface layer of the first metal layer 2. Similarly, to improve adhesion and reliability, copper or one or more metal elements can be added to the above-mentioned metals or alloys, the metal elements being selected from copper, or aluminum, magnesium, calcium, beryllium, yttrium, titanium, molybdenum, indium, tin, zinc, neodymium, nickel and aluminum. The first metal layer 2 may be formed of a plurality of metal layers.

In the case where a thin copper-alloy film or a thin aluminum-alloy film with a thickness of 100 nm or more, or 150 nm or more is used as the first metal layer 2, the visible light hardly transmits therethrough. Therefore, the first metal layer 2 can exert sufficient light shielding properties with a thickness of 100 nm to 300 nm, for example. The first metal layer 2 may be formed of three-layer configuration of indium copper alloy/magnesium copper alloy/indium copper alloy, with the thicknesses thereof being 10 nm/120 nm/15 nm, respectively. In this case, for example, an amount of addition of indium relative to copper is 18 at %, and an amount of addition of magnesium relative to copper is 0.5 at %.

A method of forming the first metal layer 2 will be described. To improve adhesion between the transparent substrate 10 and the first metal layer 2, or adhesion between the first metal layer 2 and the underlayer film of the first metal layer 2, oxygen gas is introduced in forming the first metal layer 2, i.e. in forming a film at a boundary surface between the transparent substrate 10 and the first metal layer 2, or a boundary surface between the under layer film and the first metal layer 2. A deposition apparatus that can be used includes a vacuum film deposition apparatus such as a sputtering apparatus. For example, a metal layer containing a large amount of oxygen and having a thickness ranging from 2 nm to 30 nm may be formed on the surface or the boundary surface of the first metal layer 2.

An example of the material that can be used for the black layer 1 forming the first wiring layer 3 is carbon or carbon nanotube, which serves as a light-absorbable color material. A plurality of organic pigments may be added to the black layer 1 to adjust the color. The optical density of the black layer 1 acquired by transmittance measurement may be set to less than 2, for example. For example, the optical density of the black layer 1 acquired by transmittance measurement is preferably in a range from 0.4 to 1.8 per unit thickness of 1 μm, and the thickness of the black layer 1 is favorably in a range from 0.1 μm to 0.7 μm.

For example, in the case where the black layer 1 is formed using only carbon as a color material, reflectance of light reflected at the boundary surface between the transparent substrate 10 and the black layer 1 may exceed 3%, when the optical density is 2, or 3 or more. The optical density or reflection color of the black layer 1, or the reflectance at the boundary surface between the transparent substrate 10 and the black layer 1 can be appropriately determined by appropriately selecting a black color material such as carbon or adjusting an amount of organic pigments or a resin to be added to carbon. For example, the reflectance at a boundary surface between the transparent substrate 10 and the black layer 1 can be 3% or less in the visible light region with a wavelength ranging from 400 nm to 700 nm.

Next, a method of forming a pattern of the black layer 1 will be described.

First, a photosensitive black coating liquid is coated onto the transparent substrate 10 (first surface 10b). Then, by using a mask corresponding to the pattern of the black layer 1, the black coating liquid applied to the transparent substrate 10 is exposed to form a patterned black layer 1. Then, after development, heating and the like, a cured black layer 1 is obtained. The black coating liquid is produced, for example, by dispersing carbon into a coating liquid which is admixed with an acrylic resin photo-crosslinkable with an organic solvent, and an initiator. The method of forming the black layer 1 is not limited to the above-described method.

Another method of forming the black layer 1 will be described.

First, a black coating liquid is applied to the transparent substrate 10 to form a black film. Thereafter, by using the film-forming method and the deposition apparatus mentioned above, a thin metal film containing a material for forming the first metal layer 2 is formed on the black film. Subsequently, wet etching is used to the pattern the thin metal film, thereby forming the first metal layer 2. Thus, a patterned first metal layer 2 is formed on the thin metal film, with the black film being partly exposed from the patterned first metal layer 2. Then, using the pattern of the first metal layer 2 formed on the black film as a mask, the black film as an underlayer is dry-etched, thereby patterning the black layer 1. According to this method, the line width of the first metal layer 2 and the line width of the black layer 1 can be approximately the same, and thus high precision pattern can be obtained. As a black coating liquid, an organic solvent is used, which is mixed with a photosensitive resin such as an acrylic resin, or a thermosetting resin, and a curing agent, initiator, monomer, dispersion or the like, and dispersed with the above-mentioned carbon or an organic pigment. With a resin having a low refractive index being mixed in the black coating liquid, reflectance at a boundary surface between the transparent substrate 10 and the black layer 1 can be lowered.

Next, a structure of the terminal portion 11 will be described.

Figure 9:
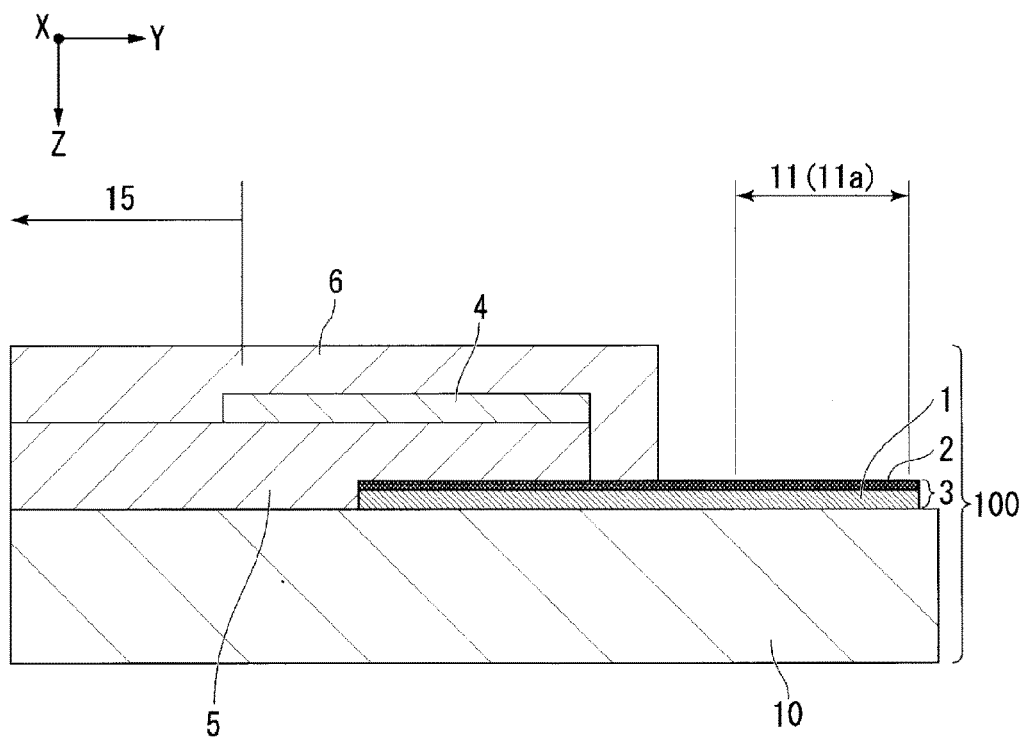
FIG. 9 is a cross-sectional view showing a part of the display device substrate included in the liquid crystal display substrate according to the first embodiment of the present invention, take along C-C' line of FIG. 2.

FIG. 9 is a cross-sectional view taken along C-C' line of FIG. 2, showing a cross section of the terminal portion 11 formed in the terminal region 11a (outside the effective display region 15). The terminal portion 11 includes a laminate structure (two layers) of the first metal layer 2 and the black layer 1, similar to the first metal layer 2 and the black layer 1 composing the first wiring layer 3. Outside the effective display region 15, the transparent resin layer 6 covers an end portion of the black matrix 4 and an end portion of the transparent resin layer 5, exposing the first metal layer 2 forming the terminal portion 11 to the terminal region 11a. As shown in FIG. 2, a plurality of terminal portions 11 is arranged in the X-direction. The terminal portions 11 are used for electrical mounting. In a structure of being incorporated into the liquid crystal display device LCD, the display device substrate 100 including the terminal portions 11 enables the touch sensing control unit 122 (described later) to supply a drive signal to the first wiring group G1 via the terminal portions 11 or detect a detection signal outputted from the first wiring group G1 via the touch sensing control unit 122.

A relative dielectric constant of the black matrix 4 according to the present embodiment is preferably in a range from 3.0 to 4.4. Hereinafter, reasons why the dielectric constant of the black matrix 4 preferably ranges from 3.0 to 4.4 will be described.

Figure 17:
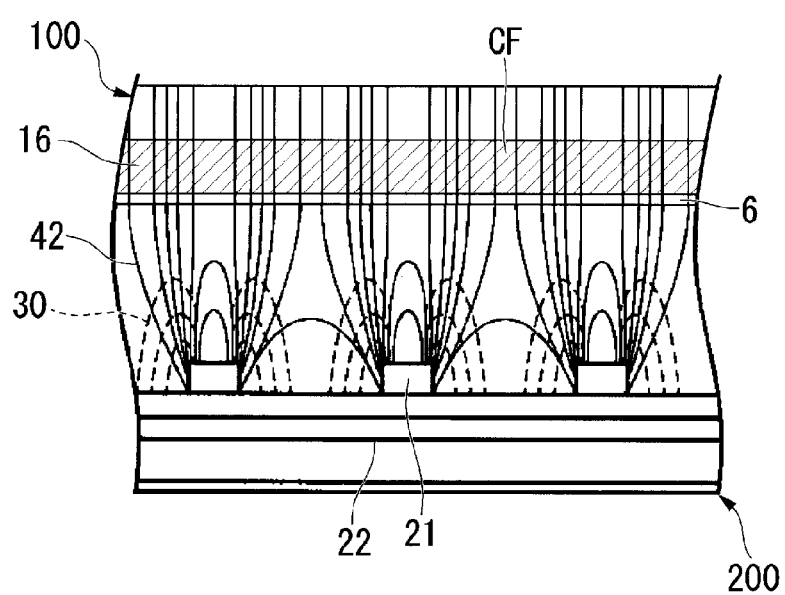
FIG. 17 is a cross-sectional view schematically showing equipotential lines in a liquid crystal display device using an FFS method.
Figure 18:
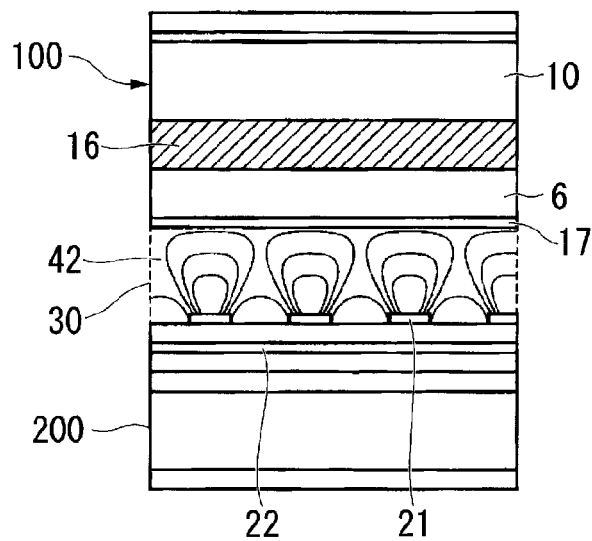
FIG. 18 is a cross-sectional view schematically showing a problem of a liquid crystal display device using an FFS method, when a transparent electrode (conductive film) is provided between a color filter and a liquid crystal layer.
Figure 19:
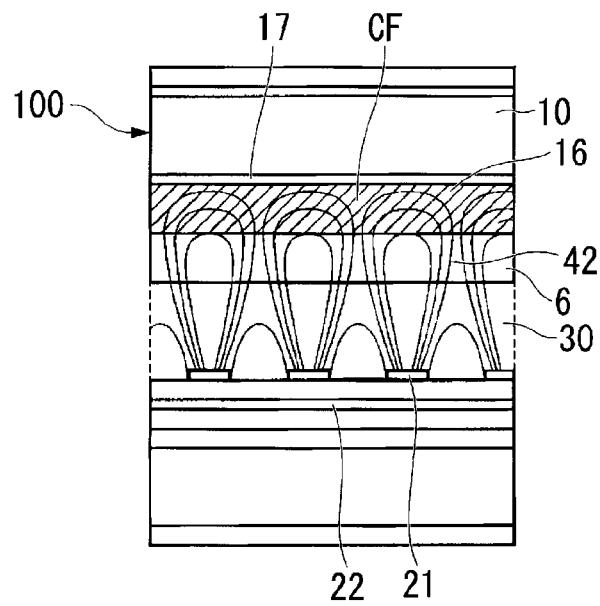
FIG. 19 is a cross-sectional view schematically showing a problem of a liquid crystal display device using an FFS method, when a transparent electrode (conductive film) is provided between a color filter and a liquid crystal layer.

As shown in FIG. 17, according to the liquid crystal display device using an FFS method, for example, liquid crystal is driven by a fringe electric field produced between the pixel electrode 21 having a comb-like shape and the common electrode 22 located below the pixel electrode 21. The equipotential lines in the fringe electric field are preferably formed uniformly towards the color filter 16 from the liquid crystal layer 30. In the case where a pattern having high a relative dielectric constant is provided on a layer close to the liquid crystal layer 30, the equipotential lines are distorted to easily cause image quality deterioration, such as light leakage or formation of a dark portion. However, the black film (cured black matrix), containing dispersed carbon, used for the black color material of the black matrix in many cases has extremely high relative dielectric constant which is around from 10 to 20. In liquid crystal driving using a horizontal electric field method such as FFS or IPS, black matrix having high a relative dielectric constant greatly affects the liquid crystal driving.

Therefore, in the liquid crystal display device or the display device substrate of the embodiment of the present invention, a black matrix having a low relative dielectric constant ranging from 3.0 to 4.4 is preferably used. The relative dielectric constant is measured, with a measuring instrument such as an impedance analyzer, using a frequency range from 60 Hz to 480 Hz that is the driving frequency of liquid crystal. In a colored film (including black film) of which the base material is a transparent resin such as acryl, an amount of color material or pigments has to be dispersed into the black film or the color film to secure effective light shielding properties or colorability. The lower limit of the relative dielectric constant of the color film is 3.0, in the case where an appropriate amount of pigments is dispersed. When the relative dielectric constant is 2.9 or less, a color material with an amount sufficient for coloring or light shielding cannot be added to the color film. In a liquid crystal display device of an FFS method where initial alignment is horizontal and has positive dielectric anisotropy, Δε is selected from a slightly high dielectric anisotropy, for example, ranging from 4.5 to 6.5. Liquid crystal having the selected dielectric anisotropy is applied to the present embodiment. With this configuration, several advantages can be obtained. The advantages particularly include lowering the threshold voltage in liquid crystal driving, and improving responsiveness (rising edge) of liquid crystal. In other words, the relative dielectric constant of the display device substrate or the components of the color filter is set to 4.4 or less, which is lower than the relative dielectric constant of the liquid crystal. Hence, appropriate conditions for driving the liquid crystal can be obtained. The relative dielectric constant of the black matrix 4 can be 4.4 or less by using either a light shielding film containing a mixed color material where a plurality of organic pigments are combined, or a light shielding film where 10% or less amount of carbon at a solid content ratio of the color material is added to the above-mentioned several pigments. For the resin used for a dispersion base material of the black matrix 4, it is preferable to use a resin having a low refractive index.

The black matrix 4 (second light shielding portion 4b) is arranged between two adjacent pixels. Specifically, the black matrix 4 is arranged to face a boundary region located between a first pixel at the center of FIG. 1 and a second pixel on the left side of the first pixel. In other words, the black matrix 4 is arranged to face a boundary region located between the pixel electrode 21 included in the first pixel and the pixel electrode 21 included in the second pixel. In the boundary region, the liquid crystal layer 30 is present between the display device substrate 100 and the array substrate 200. Also, the boundary region corresponds to an alignment failure region, which will be described later, indicated by a reference sign 40 in FIG. 15.

Similarly, the first light shielding portion 4a of the black matrix 4 is provided to face the boundary region located between two adjacent pixels.

(Array Substrate)

As shown in FIGS. 1 and 5 to 8, the array substrate 200 is bonded to the transparent substrate 10 to face the first surface 10b thereof via the liquid crystal layer 30. The array substrate 200 is provided with the transparent substrate 20 (second transparent substrate), the gate wiring 52 and a gate electrode 53 formed on the transparent substrate 20, a third insulation layer 26 formed on the transparent substrate 20 so as to cover the gate wiring 52 and the gate electrode 53, the source wiring 54, a source electrode 55, the drain electrode 56 and the channel layer 50 which are formed on the third insulation layer 26, a second insulation layer 25 formed on the third insulation layer 26 so as to cover the source wiring 54, the source electrode 55, the drain electrode 56 and the channel layer 50, the common electrode 22 formed on the second insulation layer 25, a first insulation layer 24 formed on the second insulation layer 25 so as to cover the common electrode 22, and the pixel electrode 21 formed on the first insulation layer 24.

In such an array substrate 200, an active element (i.e., TFT, described later) is provided. The active element 51 has a transistor structure configured of the source wiring 54, the source electrode 55, the drain electrode 56 and the channel layer 50.

Figure 5:
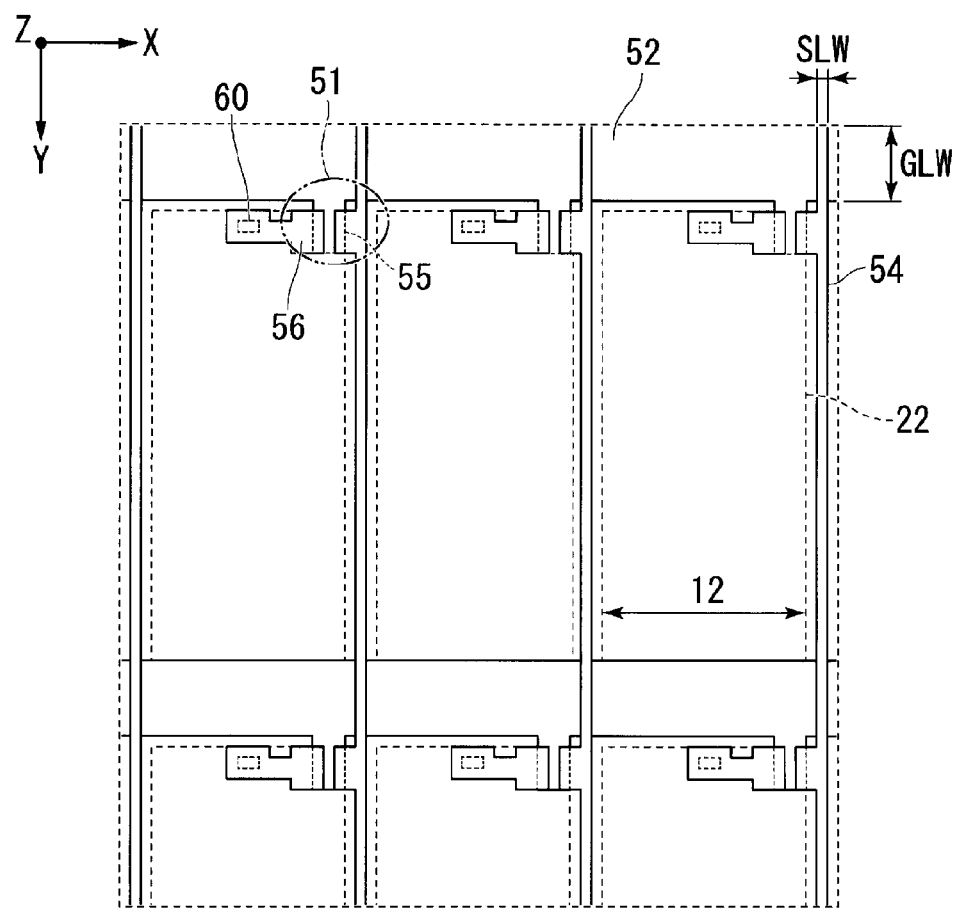
FIG. 5 is a plan view showing a partially enlarged array substrate included in the liquid crystal display device according to the first embodiment of the present invention, that is showing an example of a positional relationship among an active element, a gate wiring, and a source wiring, and showing an opening of an array substrate which corresponds to the position of an opening of the black matrix provided on the display substrate shown in FIG. 4.
Figure 6:
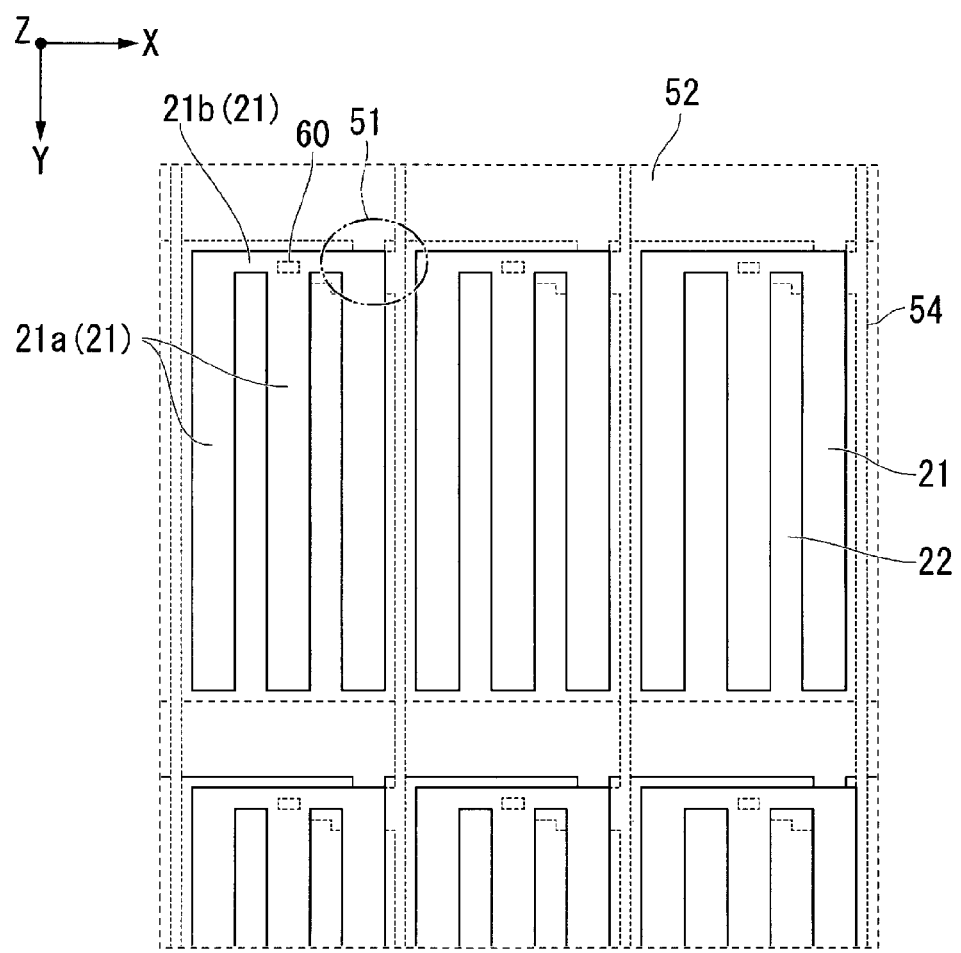
FIG. 6 is a plan view showing a partially enlarged array substrate included in the liquid crystal display device according to the first embodiment of the present invention, that is, showing a laminate structure in which pixel electrodes are laminated on the opening of the array substrate shown in FIG. 5.
Figure 7:
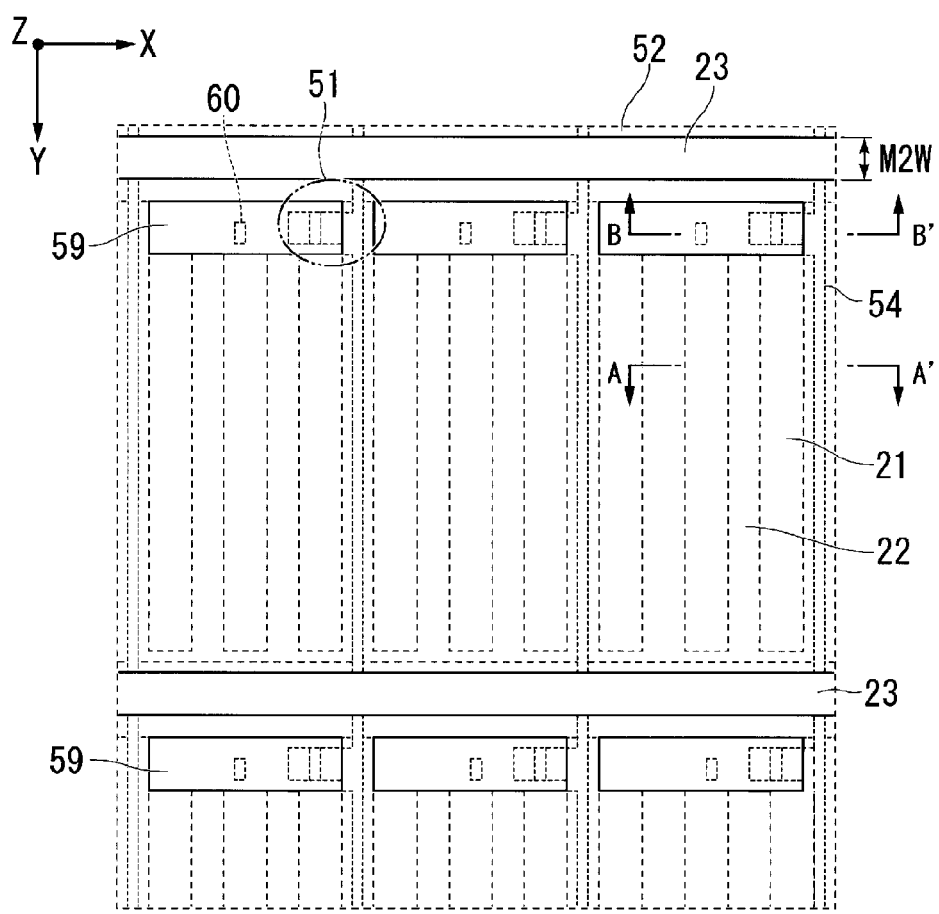
FIG. 7 is a plan view showing a partially enlarged array substrate included in the liquid crystal display device according to the first embodiment of the present invention, that is, showing a laminate structure in which a second wiring layer and a light shielding layer are laminated on the array substrate shown in FIG. 6.
Figure 8:
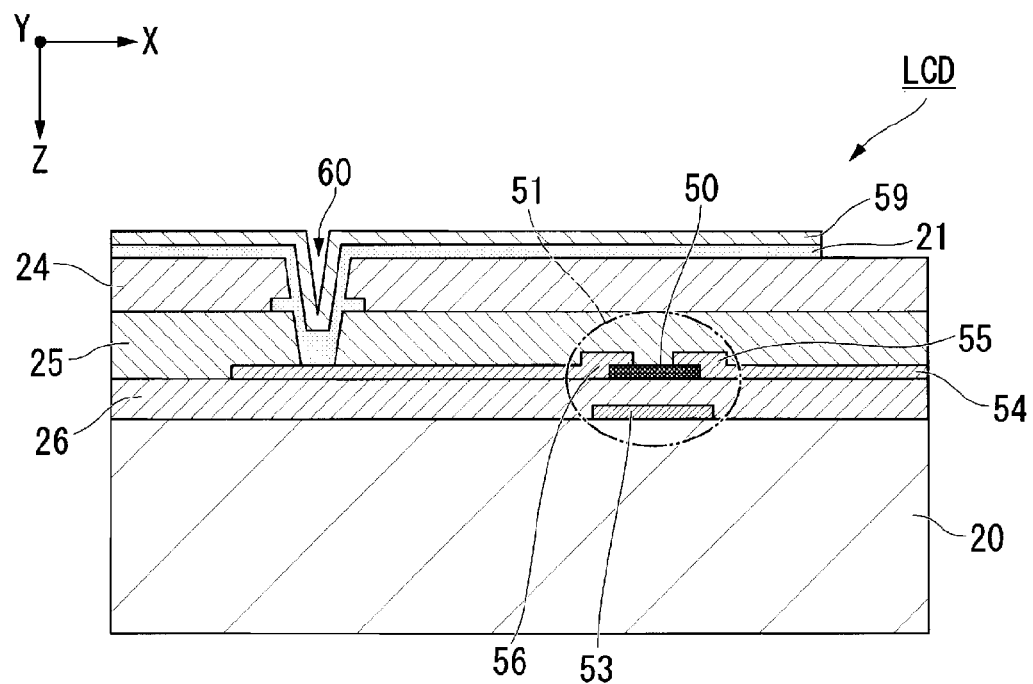
FIG. 8 is cross-sectional view showing a part of the array substrate included in the liquid crystal display device according to the first embodiment of the present invention, taken along B-B' line of FIG. 7.

FIG. 5 is plan view of a structure before forming the pixel electrode 21 on the array substrate 200, a view illustrating a positional relationship between the active element 51, the source wiring 54, the gate wiring 52, the drain electrode 56, the contact hole 60, the common electrode 22 and the like. FIG. 6 is a plan view of a structure after forming the pixel electrode 21 connected to the drain electrode via the contact hole 60, a view illustrating a structure before forming the second wiring layer 23 and the light shielding layer 59. FIG. 7 is a plan view showing a structure after forming the second wiring layer 23 and the light shielding layer 59. FIG. 8 is a cross-sectional view taken along B-B' line of FIG. 7.

In the partial enlarged views shown in FIGS. 5 to 7, the common electrode 22 is provided in the opening 12 of the pixel. The active element 51 is provided at a position where the gate electrode 53 extending in the Y-direction from the gate wiring 52 overlaps with the source electrode 55 extending in the X-direction from the source wiring 54. In the example shown in FIG. 5, the active element 51 is located at an upper right corner of the pixel. As shown in FIG. 8, the active element 51 includes the drain electrode 56 electrically connected to the pixel electrode 21 via the contact hole 60, the source electrode 55 electrically connected to the source wiring 54, the channel layer 50 provided between the drain electrode 56 and the source electrode 55 to partially overlap with both electrodes 55 and 56, and the gate electrode 53 provided facing the channel layer 50 via the third insulation layer 26. The source wiring 54 is arranged in parallel to the Y-direction, and the gate wiring 52 is arranged in parallel to the X-direction. According to the present embodiment, the gate wiring 52 (gate electrode 53) is directly formed on the transparent substrate 20. However, an insulation layer may be formed on the transparent substrate 20 in advance, and the gate wiring 52 (gate electrode 53) may be formed on the insulation layer. In the active element 51, electric field is produced between the channel layer 50 and the gate electrode 53 (field effect), in response to a signal supplied to the gate electrode 53, whereby a switching operation of the transistor is performed.

The pixel electrode 21 is provided facing the common electrode 22 via the first insulation layer 24. The pixel electrode 21 is made of indium oxide or ITO which is an oxide mixed with tin oxide. The pixel electrode 21 is provided to face a corresponding one of a plurality of openings 12 arranged in a matrix, and has a comb-like shape (See FIG. 6). Specifically, in a single pixel, the pixel electrode 21 is provided with three comb-like electrode portions 21a and an electrode base portion 21b. The electrode base portion 21b extends in the X-direction, i.e. is provided to overlap with the contact hole 60, and electrically connected to the drain electrode 56 via the contract hole 60. Three comb-like electrode portions 21a extend in the Y-direction from the electrode base portion 21b. As shown in FIG. 1, the first insulation layer 24 is exposed to the liquid crystal layer 30 (alignment film is omitted) from between the adjacent comb-like electrode portions 21a, where a horizontal electric field is produced when the active element 51 is driven.

As shown in FIG. 7, the second wiring layer 23 and the light shielding layer 59 are arranged to be in parallel with each other. The second wiring layer 23 (second wiring pattern) is provided above the gate wiring 52, that is, at a position corresponding to the gate wiring 52 (position overlapping the gate wiring 52). The second wiring layer 23 having the line width M2W extends along the gate wiring 52 (in parallel to the X-direction) to be in parallel to the short side of the pixel opening 12.

The light shielding layer 59 is provided at a position corresponding to the active element 51, covering the active element 51 via the first insulation layer 24 as shown in FIG. 8. As shown in FIGS. 6 and 7, the light shielding layer 59 is formed covering the electrode base portion 21b of the pixel electrode 21. The light shielding layer 59 is made of the same metal as the second wiring layer 23. The light shielding layer 59 extends in the X-direction to be in parallel to the second wiring layer 23.

The light shielding layer 59 and the second wiring layer 23 are formed using the same metal layer in the same forming process. A known patterning technique is used for forming the layers. The second wiring layer 23 and the light shielding layer 59 are made of an aluminum alloy (second metal layer) containing neodymium. The light shielding layer 59 and the second wiring layer 23 may be formed being aligned in the lamination direction of the array substrate 200. In other words, the second wiring layer 23 can be formed of the second metal layer, while having a light shielding pattern formed of the second metal layer (light shielding layer 59). The light shielding pattern can cover the active element 51 via the first insulation layer 24.

The light shielding layer 59 and the second wiring layer 23 can be electrically connected to each other. In this case, noise is likely to be picked up. Accordingly, the light shielding layer 59 and the second wiring layer 23 are preferably spaced apart from each other for electrical isolation.

The light shielding layer 59 may be located above the first insulation layer 24 and may be directly formed on the pixel electrode 21 (electrode base portion 21b). Alternatively, the light shielding layer 59 may be formed on the first insulation layer 24 but underneath the pixel electrode 21 (electrode base portion). In the present embodiment, an example structure is illustrated in FIG. 8, where the light shielding layer 59 is provided on the pixel electrode 21. A planar pattern of the light shielding layer 59 is appropriately designed conforming to portions requiring prevention of light entry. In other words, the light shielding layer 59 according to the embodiment of the present invention has advantages that the light shielding layer 59 can be formed simultaneously with and using the same metal layer as the second wiring layer 23, and that a light shielding pattern can be designed, as desired, to shield light.

The second wiring layer 23 which is one of touch sensing wirings may be arranged above the source wiring 54 not above the gate wiring 52. However, in this case, the second wiring layer 23 is likely to pick up noise due to a video signal. To reduce noise due to the video signal, the second wiring layer 23 is preferably formed on the first insulation layer 24. Also, the number of layers or the thickness of the insulation layer to be formed on the transparent substrate 20 may be increased. An insulation layer may be separately formed on the upper or lower surface of the second wiring layer 23, or the upper or lower surface of the light shielding layer 59. The insulation layer thus provided to contact the surfaces of the second wiring layer 23 and the light shielding layer 59 may be formed of an inorganic insulation film referred to as SOG (Spin On Glass), or an organic insulation layer such as an acrylic resin. In this case, the inorganic insulation layer or the organic insulation layer is laminated on the first insulation layer 24, prior to formation of the second wiring layer 23.

The gate wiring 52 and the source wiring 54 are metal wirings each having a two-layer structure, the layers being respectively made of a copper alloy and titanium. In such a two-layer structure, the copper alloy is used for the upper layer. The channel layer 50 is formed of an InGaZnO based oxide semiconductor. According to the present embodiment, the material of the above-described structure is not limited. As a metal or alloy material for forming the touch sensing wiring, various materials mentioned above may be used. The structure of the touch sensing wiring is not limited to a single layer structure, but a laminate structure can be used in which metal oxides are laminated as a plurality of metal layers.

The channel layer 50 of the active element 51 can be formed of a silicon-semiconductor such as of poly-silicon or an oxide semiconductor. The channel layer 50 is preferably formed of an oxide semiconductor such as IGZO containing two or more metal oxides selected from gallium, indium, zinc, tin and germanium oxides. For example, the channel layer 50 is formed of an InGaZn based metal oxide.

The active element 51 in which an oxide semiconductor such as IGZO is used for the channel layer 50 has high electron mobility, and hence is capable of applying required drive voltage to the pixel electrode 21 within a short period of time, e.g., 2 msec (milliseconds) or less. For example, one frame in double speed driving (when the number of display frames per second is 120) is 8.3 msec. In this case, when liquid crystal driving and a touch sensing driving are performed in a time-sharing manner, approximately 6 msec, as a result of subtracting 2 msec allocated to liquid crystal driving from the period of one frame, can be allocated to touch sensing driving.

Since the active element 51 where an oxide semiconductor is used for the channel layer 50 has a lower leak current as described above, the drive voltage applied to the pixel electrode 21 can be retained for a long period of time. When touch sensing driving and liquid crystal driving are performed in a time sharing manner, for example, a signal line, a scanning line and an auxiliary capacitive line or the like of the active element are formed of copper wiring having lower wiring resistance than the aluminum wiring, and further IGZO can be used for the material of the channel layer 50 of the active element to enable the active element to be driven in a short period of time. In this case, in the scanning operation of touch sensing driving, time margin is increased, whereby a change in the produced electrostatic capacitance can be detected precisely. The oxide semiconductor such as IGZO is used for the active element so that the driving time of liquid crystal or the like can be shortened. Hence, sufficient time margin can be produced for the period allocated to the touch sensing operation, during video signal processing for the entire display screen. Moreover, the active element 51 using an oxide semiconductor for the channel layer 50 has almost no electrical leakage in the image display operation, thereby securing stable image display operation, simultaneously performing liquid crystal driving and touch sensing driving.

Needs or interfaces for touch sensing operation are being diversified into, for example, personal authentication in which a finger print or the like is detected, or touch input which uses a fine nib, or the like. To achieve these needs or interfaces, high accuracy is demanded. In this case, an amplitude of the touch sensing drive signal may need to be made larger, that is, voltage range of the signal (peak to peak) may need to be extended (large amplitude is required). The active element 51 using an oxide semiconductor for the channel layer 50 has higher electrical breakdown resistance than a silicon-based semiconductor. Hence, the active element 51 using an oxide semiconductor is suitable for such an application requiring a large amplitude.

A thin film transistor using an oxide semiconductor for the channel layer 50 has a bottom-gate type structure, for example. A top gate type, or double gate type transistor may be used for the thin film transistor. When top gate type structure is used as a structure of a thin film transistor, the channel layer of the thin film transistor faces a surface of the array substrate, the surface being close to the backlight unit. This structure may be disadvantageous because the light emitted from the backlight unit is likely to enter the channel layer. In a cross section, a light shielding layer (light shielding pattern) can be formed on the transparent substrate 20 so as to cover the channel layer facing the backlight unit. In this case, the light shielding layer is formed as a bottom layer in the laminate structure of the array substrate 200. However, according to this structure, the second wiring layer 23 simultaneously formed with the light shielding layer 59 as the same metal layer is also located in the bottom layer. In other words, the distance between the second wiring layer 23 and the first wiring layer 3 in the thickness direction of the array substrate 200 becomes longer. Therefore, there is a concern that electrical noise increases to affect the touch sensing operation.

A thin film transistor provided with a channel layer using an oxide semiconductor may be used as an active element configuring an optical sensor or configuring another active element. The active element having such a structure has high memory effect (small leak current) so that the pixel capacitance after applying the liquid crystal drive voltage can be retained easily.

A driver circuit may be formed at a location corresponding to the frame portions Fx and Fy provided outside the effective display region on the transparent substrate 20 to control liquid crystal driving and touch sensing driving. The active element configuring the driver circuit may include a channel layer 50 formed of an oxide semiconductor such as IGZO. The driver circuit is formed on the transparent substrate 20 to overlap the frame portions Fx and Fy in plan view, whereby an area of the frame referred to as a bezel can be made small so that the display area of the liquid crystal display device LCD can be increased.

(Liquid Crystal Layer)

The liquid crystal layer 30 is provided between the display device substrate 100 and the array substrate 200 which are bonded face to face. The liquid crystal molecules of the liquid crystal layer 30 are driven by the fringe electric field produced between the pixel electrode 21 and the common electrode 22 in response to switching operation of the active element 51. The liquid crystal has positive dielectric anisotropy and the initial alignment thereof is horizontal. In the case of liquid crystal having positive dielectric anisotropy, the direction of alignment in the alignment process using rubbing or photo alignment may be inclined by 5° to 20° in plan view with respect to a direction along which the comb-like pixel electrodes are arranged.

(Function of Liquid Crystal Display Device LCD)

Next, with reference to FIG. 14, a liquid crystal display according to the present embodiment will be described.

Figure 14:
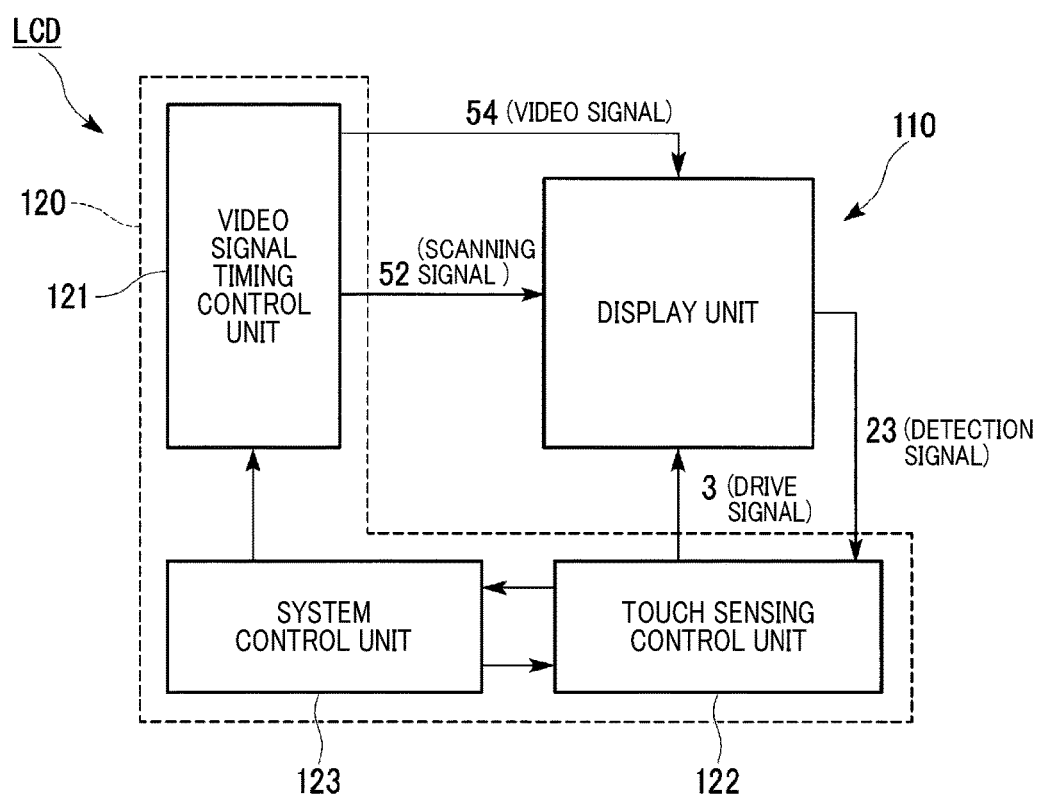
FIG. 14 is a block diagram showing a liquid crystal display device according to the embodiments of the present invention.

FIG. 14 is a block diagram illustrating a function of a liquid crystal display device LCD according to the present embodiment. The liquid crystal display device LCD according to the present embodiment is provided with a display unit 110 provided at a location corresponding to the effective display region 15, a control unit 120 that controls the display unit 110 and the touch sensing function. The control unit 120 has a known configuration including a video signal timing control unit 121, a touch sensing control unit 122 and a system control unit 123. The control unit 120 controls liquid crystal driving and touch sensing driving. The system control unit 123 controls the video signal timing control unit 121 and the touch sensing control unit 122.

In the liquid crystal display device LCD, for example, LED light emitting elements that emit red light, green light, blue light or the like, are used for a light source of the backlight unit. The control unit 120 controls a color display with a field sequential method.

According to the liquid crystal display device LCD provided with the above-described control unit 120 may perform a control in which a voltage different from the liquid crystal drive voltage is applied between either the first wiring layer 3 or the second wiring layer 23, and the common electrode 22, or between each of the first wiring layer 3 and the second wiring layer 23, and the common electrode. This control method enables faster rise (ON) and fall (OFF) of liquid crystal molecules, and enables assist of liquid crystal driving such as alignment control.

Liquid crystal driving and touch sensing driving are not necessarily driven in a time-sharing manner. For example, the second wiring layer 23 can be used as a detection electrode for constant voltage, and the first wiring layer 3 can be used as a driving electrode for touch sensing. In this case, touch sensing driving less interferes liquid crystal driving and hence the driving frequency of the pixel electrode for driving the liquid crystal, may be different from the driving frequency of the touch sensing electrode. For example, the second wiring layer 23 is connected to the ground via a resistor having a high resistance, whereby the voltage of the second wiring layer 23 can be made constant. Moreover, a drive voltage of touch sensing is preferably set to a low value which is unlikely to influence liquid crystal driving, e.g., a value not more than a threshold voltage Vth of the liquid crystal. Thus, touch sensing drive does not influence liquid crystal driving so that the power consumption can be lowered.

The driving frequency of touch sensing can be set to a frequency which is unlikely to pick up external noise. Further, the control unit 120 may have a function of detecting external noise frequency, and a function of adjusting the range of the driving frequency of touch sensing so as not to include the detected external noise frequency. For example, the driving frequency of touch sensing may range from several KHz to several tens of KHz, and the liquid crystal driving frequency may range from 60 Hz to 480 Hz. Furthermore, touch sensing driving and liquid crystal driving can be performed in a time sharing manner. In the case where the first wiring layer 3 is used as a drive electrode (touch sensing drive scanning electrode), the frequency of the scan signal to detect electrostatic capacitance can be adjusted as desired, in conformity with the required speed of touch input. The driving frequency of touch sensing is preferably higher than the above-mentioned liquid crystal driving frequency. In addition, it is preferable to change the driving frequency of touch sensing to be different from the frequencies corresponding to external noise entering from outside the liquid crystal display device, and internal noise occurred inside the liquid crystal display device. Alternatively, in touch sensing driving, the second wiring layer 23 may be permitted to serve as a drive electrode and the first wiring layer 3 may be permitted to serve as a detection electrode. In this case, for example, the second wiring layer 23 serves as a drive electrode (scanning electrode) to which alternating current (AC) pulse is applied at a constant frequency.

In touch sensing driving and liquid crystal driving, an inversion drive method where positive and negative voltages are inverted may be used for the voltage (AC voltage) applied to the drive electrode. Also, a dot inversion drive method where the pixel electrodes are driven on a pixel-by-pixel basis may be used.

Alternatively, the voltage range (peak to peak) of an AC signal applied to the touch sensing drive voltage may be lowered, thereby reducing an influence of the touch sensing drive voltage to the liquid crystal display.

In the case where an offset voltage is applied (bias voltage is applied), to AC voltage or pulse voltage as the touch sensing drive voltage, the electric potential (voltage) of a constant voltage can be set to a center value (average value) of the AC voltage or the like. The touch sensing drive voltage is applied, for example, to the first wiring layer 3. The electric potential of the second wiring layer 23 is not limited to 0 (zero) volt, where the electric potential is of the second wiring layer 23 facing the first wiring layer 3 is constant. During image display driving or touch sensing driving, the second wiring layer 23 is maintained at a constant electric potential.

The first wiring layer 3 or the second wiring layer 23 can be a constant electric potential during liquid crystal driving or touch sensing driving. Alternatively, the second wiring layer 23 can be grounded via a resistor having a high resistance. The resistance value thereof may range from a few giga-ohm to a few peta-ohm. Typically, the resistance can be within a range from 1 tera-ohm to 50 tera-ohm. However, when an oxide semiconductor such as IGZO is used for forming the channel layer included in the active element 51 of the liquid crystal display device LCD, a resistor having a resistance value lower than 1 giga-ohm may be used in order to reduce probability of burning-in the liquid crystal pixels. In the touch sensing operation, a resistor having a resistance value lower than 1 giga-ohm may be used in order to reset electrostatic capacitance, for a simple control performed without a reset circuit for resetting electrostatic capacitance.

The voltage Vcom of the common electrode used for liquid crystal driving is, generally, an AC pulse signal including a signal for a frame inversion operation in liquid crystal driving. For example, AC voltage of ±2.5 V is applied thereto on a frame-by-frame basis. In the present embodiment, the AC voltage required for the above-described driving is not used as a constant electric potential. The constant electric potential of the present embodiment is required to be a voltage at least lower than the threshold (Vth) of liquid crystal display driving, and to allow voltage variation within a predetermined range.

For example, a driving frequency of the touch sensing electrode applied to the first wiring layer 3 or the second wiring layer 23 can be different from or higher than the liquid crystal driving frequency.

Generally, the liquid crystal driving frequency is 60 Hz or defined to be an integral multiple of 60 Hz. Usually, a portion (touch sensing portion) at which the touch sensing is performed is affected by noise corresponding to the frequency of liquid crystal driving. Further, since generally used domestic power sources are AC power sources of which the frequency is 50 Hz or 60 Hz, the touch sensing portion is likely to pick up noise propagated from electric equipment operated by such an external power source. Accordingly, the touch sensing driving frequency is slightly shifted from 50 Hz or 60 Hz.

Setting the frequency to be different from 50 Hz or 60 Hz, influence of noise caused by liquid crystal driving or noise propagated from external electric equipment can be significantly reduced. The amount of shift may be small, for example, ±3% to ±17% shift from the noise frequency, whereby interference of noise frequency can be reduced. For example, to reduce noise, the frequency of touch sensing driving can be selected from a frequency range from several KHz to several hundred KHz, excluding frequencies interfering with the above-described liquid crystal drive frequency or a power source frequency.

(Operation of Liquid Crystal Display Device LCD)

Next, operation of the liquid crystal display device having the above-described configuration will be described.

While the control unit 120 drives the liquid crystal display device LCD, touch sensing operation is performed to detect an input position of a finger or a pointer or the like on the second surface 10a of the display device substrate 100. Specifically, the touch sensing control unit 122 sets the second wiring layer 23 to a constant electric potential and applies a detection drive voltage to the first wiring layer 3, to detect a change in electrostatic capacitance (fringe capacitance) between the first wiring layer 3 and the second wiring layer 23. For example, when a finger or a pointer approaches or touches the second surface 10a, electrostatic capacitance (fringe capacitance) between the first wiring layer 3 and the second wiring layer 23 changes at a cross point between the first wiring layer 3 and the second wiring layer 23 corresponding to the planar position of the finger or the pointer. The touch sensing control unit 122 detects the position at which the electrostatic capacitance has changed, thereby specifying the position of the finger or the pointer.

Meanwhile, the video signal timing control unit 121 controls display of a plurality of pixels arranged in a matrix. Specifically, the video signal timing control unit 121 transmits a video signal to a source wiring 54 connected to the source electrode 55 configuring the active element 51, and transmits a scanning signal to the gate wiring 52 connected to the gate electrode 53 configuring the active element 51. Thus, the gate wiring 52 is successively scanned by the video signal timing control unit 121, and the source wiring 54 receives the video signal from the video signal timing control unit 121. In response to reception of the scanning signal and the video signal, the active element 51 is driven and the liquid crystal drive voltage is applied between the common electrode 22 and the pixel electrode 21 to drive the liquid crystal, thereby performing liquid crystal driving by which the liquid crystal molecules in the liquid crystal layer 30 are driven. As a result, an image is displayed on the display unit 110.

Thus, while the liquid crystal display is driven, the light emitted from the backlight unit enters the array substrate 200. The active element 51 is covered with the light shielding layer 59. Hence, the light shielding layer 59 prevents reflected light due to light emitted from the backlight unit from entering the active element, and light incident on the inside of the liquid crystal display device LCD from outside can be prevented from entering the active element. Further, the gate electrode 53 shields light emitted from the backlight unit towards the back surface of the active element 51. Since the light shielding layer 59 can be simultaneously formed with the second wiring layer 23 which is one of the touch sensing electrodes, image quality can be improved with the light shielding and the touch sensing function can be added to the liquid crystal display device LCD without using additional manufacturing step.

Moreover, as shown in FIG. 1, the first wiring layer 3 and the second light shielding layer 4b are located at side edge portion of each pixel, and arranged in a line symmetrical manner with respect to the pixel center line CL. The light transmitted through the liquid crystal layer 30 while the liquid crystal layer is driven passes through the opening 12, transmits through the openings formed between adjacent first wiring layers 3, and is emitted outside the liquid crystal display device via the display surface of the liquid crystal display device. In other words, oblique light can be emitted from each pixel that is line symmetric with respect to the pixel center CL so that a uniform viewing angle can be accomplished.

Figure 15:
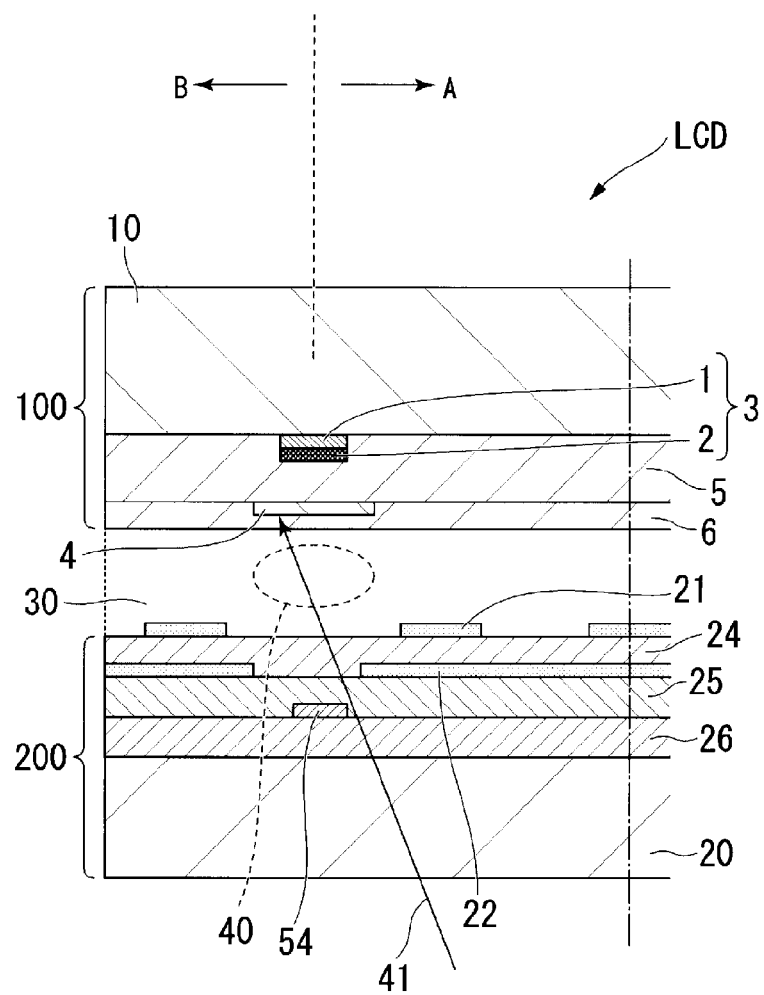
FIG. 15 is a cross-sectional view schematically showing an effect of the black matrix included in the display device substrate according to the embodiments of the present invention.

In the liquid crystal display device LCD, as shown in FIG. 15, the black matrix 4 is provided to face an alignment failure region 40 produced in the liquid crystal layer 30 and located between the display device substrate 100 and the array substrate 200, and between adjacent pixels A and B. Hereinafter, with reference to FIGS. 15 and 16, effects obtained by the black matrix 4 will be described.

Figure 16:
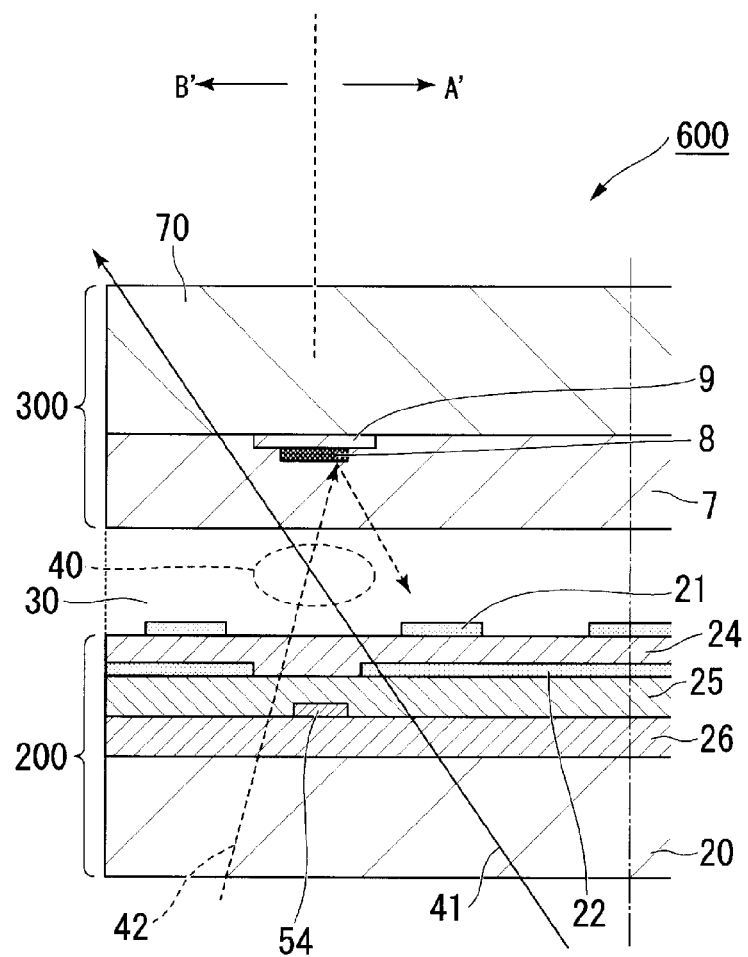
FIG. 16 is a cross-sectional view schematically showing a problem of the black matrix included in a conventional display device substrate.

FIG. 16 is a cross-sectional view showing a configuration of a conventional liquid crystal display device 600 using an FFS drive method. In the liquid crystal display device 600, a black matrix 9 is formed on a transparent substrate 70, a conductive layer 8 (metal layer) is formed on the black matrix 9, and a transparent resin layer 7 is formed on the transparent substrate 70 so as to cover the black matrix 9 and the conductive layer 8. In the liquid crystal display device 600, the distance between the black matrix 9 and the array substrate 200 is large. The liquid crystal display device 600 is provided with adjacently located pixels A' and B'. The configuration of the pixel electrode 21 and the common electrode 22 of the liquid crystal display device 600 is the same as the liquid crystal display device LCD.

FIG. 15 is a cross-sectional view showing a part of the liquid crystal display device LCD. The black matrix 4 is provided between the first wiring layer 3 and the array substrate 200. The distance between the black matrix 4 and the array substrate 200 is smaller than that between the black matrix 9 and the array substrate 200 of the liquid crystal display device 600. That is, in the liquid crystal display device LCD, the black matrix 4 is provided closer to the liquid crystal layer 30. The liquid crystal display device LCD is provided with adjacently located pixels A and B.

In both of the liquid crystal display device LCD and the liquid crystal display device 600, for example, when the liquid crystal is driven with the pixel A (A') being ON and the pixel B (B') being OFF, an alignment failure region 40 is produced where control of the liquid crystal molecules is insufficient, because of the electric field generated between the pixel electrode 21 and the common electrode 22.

Considering the conventional liquid crystal display device 600 shown in FIG. 16, since the black matrix 9 is disposed at a position far from the liquid crystal layer 30, oblique light 41 emitted from the backlight unit and passed through the pixel A' is likely to enter the pixel B'. In other words, when the pixel A' is driven, light is leaked to the pixel B' via the alignment failure region 40, causing color mixing in which the color of pixel A' is mixed with the color of the pixel B', and decreasing contrast. As described above, liquid crystal display devices provided with high definition pixels of 300 ppi or more suffer from a big technical problem of color mixing. Further, in the case where the conductive layer 8 is formed of a thin metal film in the conventional liquid crystal display device 600, light 42 emitted from the backlight unit is reflected at the conductive layer 8, and the reflected light may enter the channel portion of the active element, not shown. When the light enters the active element, the active element is likely to cause malfunction, adversely affecting the display quality.

On the other hand, in the liquid crystal display device LCD shown in FIG. 15, since the black matrix 4 is disposed close to the liquid crystal layer 30, the oblique light 41 emitted from the backlight unit and passed through the pixel A is cut off by the black matrix 4 so that the light is less likely to enter the pixel B. Even when the pixel A is ON (white), the influence to the pixel B can be made small. By providing the black matrix 4, reflected light from the first metal layer 2 is hardly incident on the active element, so that the image quality is not lowered. Further, according to the liquid crystal display device LCD having the above-described structure, the thickness of the liquid crystal cell can be reduced so that light leaking to adjacent pixels can be minimized, and line width of the black matrix can be reduced.

Second Embodiment

Figure 10:
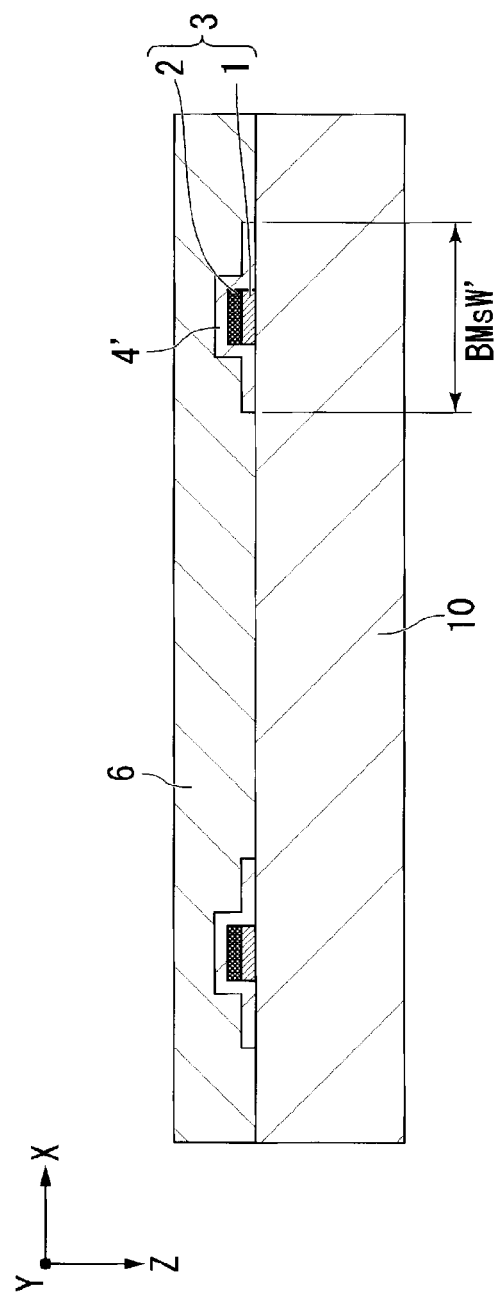
FIG. 10 is a cross-sectional view showing a part of a display device substrate according to a second embodiment of the present invention.

With reference to FIG. 10, hereinafter will be described a display device substrate according to a second embodiment of the present invention. In the second embodiment, the like reference signs are designated to the like components of the first embodiment to omit or simplify description.

FIG. 10 is a cross-sectional view showing a part of a display device substrate of the present invention.

The display device substrate according to the second embodiment includes a laminate structure composed of the black layer 1 and the first metal layer 2, a first wiring layer 3 disposed on the transparent substrate 10, a black matrix 4' provided on the transparent substrate 10 so as to cover the side surface and the surface of the first wiring layer 3, and a transparent resin layer 6 provided on the transparent substrate 10 so as to cover the black matrix 4'. The black matrix 4' has a plurality of openings 12 in the effective display region 15. With this configuration, to avoid an influence of oblique light entering an adjacent pixel via the alignment failure region 40 shown in FIG. 15, the line width BMsW' of the black matrix 4' is larger than the line width BMsW of the black matrix 4 shown in FIG. 1. As the line width BMsW' is designed to be larger, the opening ratio is decreased, however, the process for forming the transparent resin layer 5 shown in FIG. 1 can be omitted, so that the number of manufacturing processes can be reduced. Also, the display device substrate according to the second embodiment can be applied to the liquid crystal display device LCD, whereby effects similar to the first embodiment can be obtained.

Third Embodiment

Figure 11:
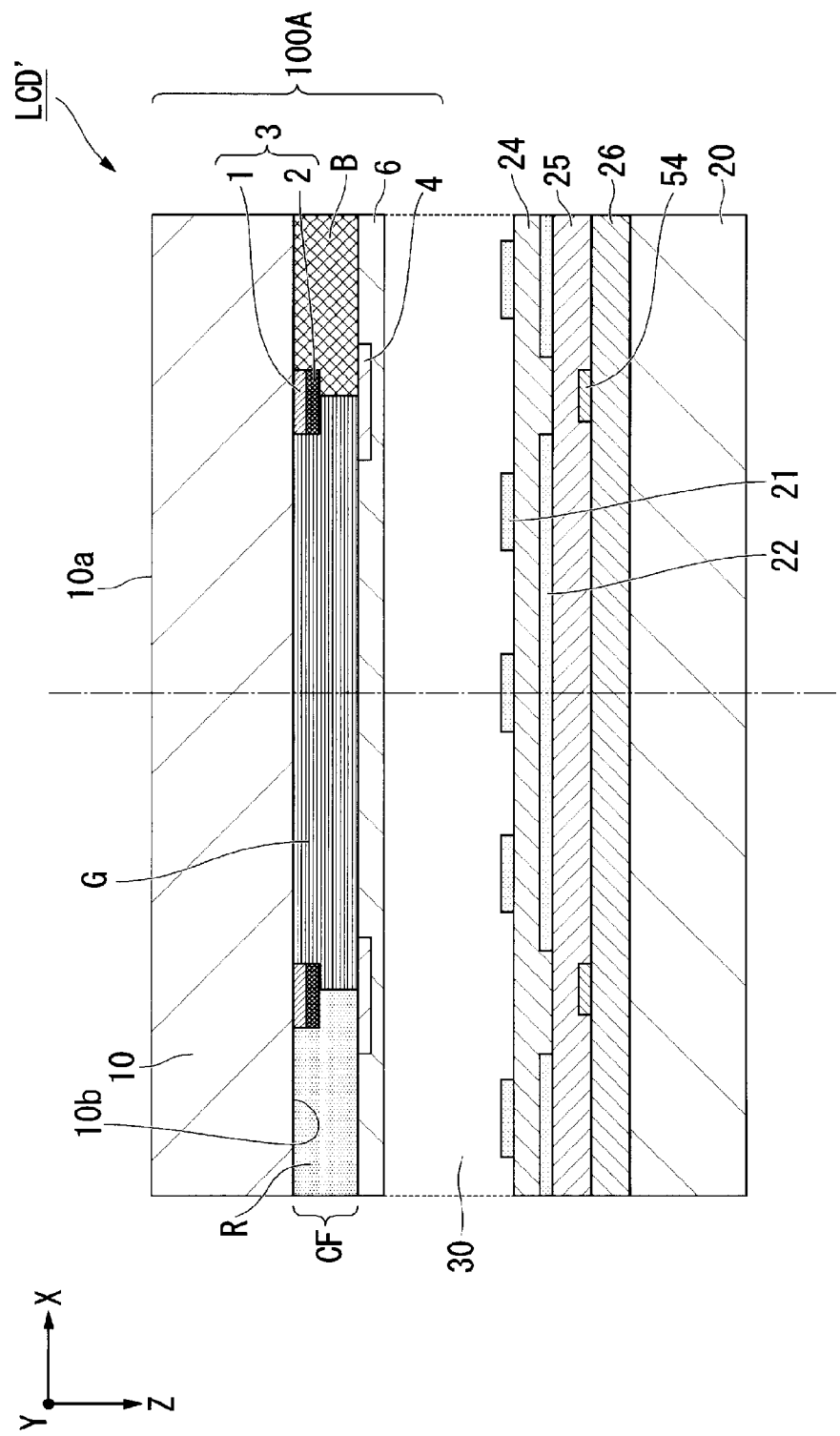
FIG. 11 is a cross-sectional view showing a part of a liquid crystal display device according to a third embodiment of the present invention.
Figure 12:
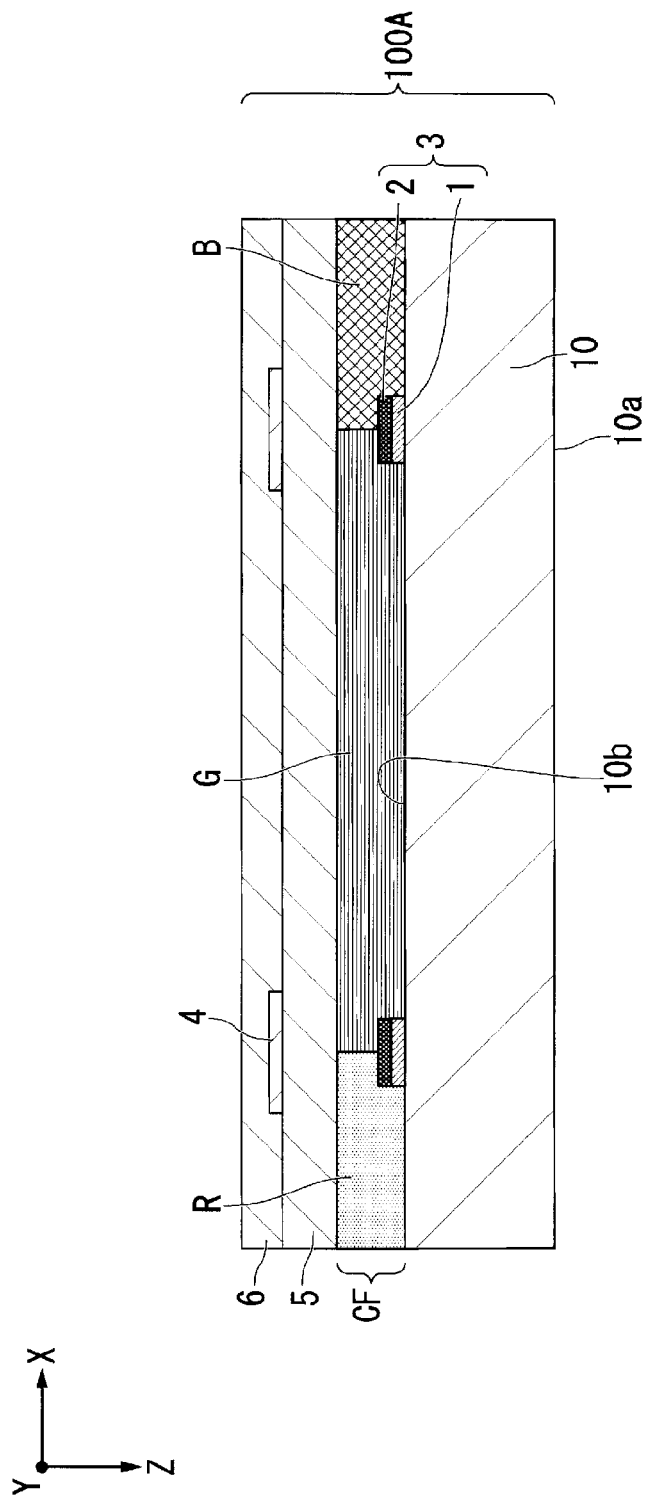
FIG. 12 is a cross-sectional view showing a part of a display device substrate included in the liquid crystal display device according to the third embodiment of the present invention.
Figure 13:
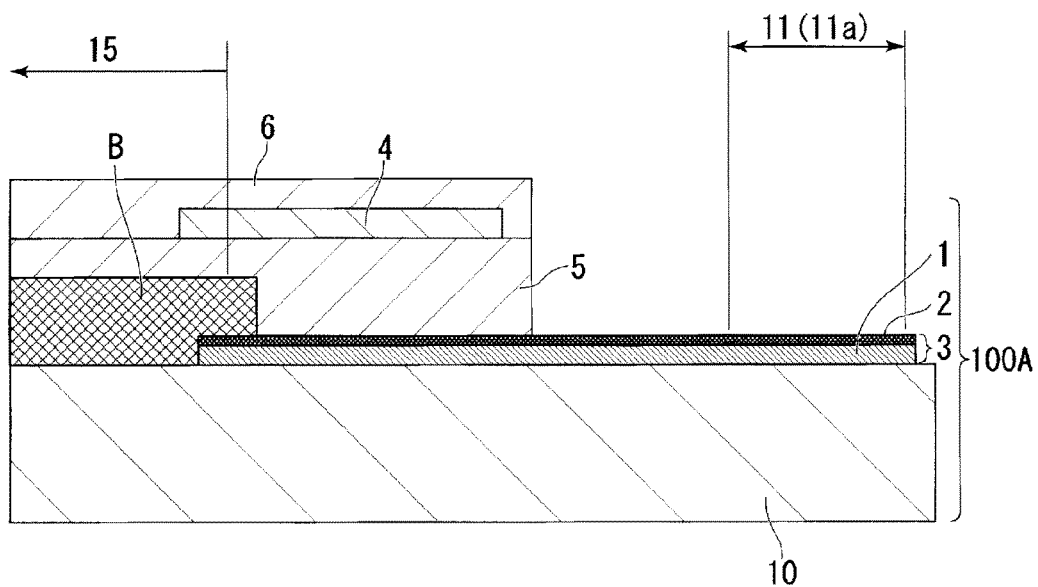
FIG. 13 is a cross-sectional view partially showing an end portion of the display device substrate according to the third embodiment of the present invention.

With reference to FIGS. 11 to 13, hereinafter will be described a display device substrate and a liquid crystal display device according to a third embodiment of the present invention. According to the third embodiment, the like reference signs are designated to the like components of the first and second embodiments to omit or simplify description.

FIG. 12 is a cross-sectional view showing a part of a display device substrate 100A according to the third embodiment of the present invention. The display device substrate 100A is used for a liquid crystal display device LCD' shown in FIG. 11. In the display device substrate 100A, the first wiring layer 3, a color filter CF (color filter layer), a transparent resin layer 5, a black matrix 4 and the transparent resin layer 6 are formed on the transparent substrate 10 in this order. In other words, the color filter CF is disposed between the first metal layer 2 and the transparent resin layer 5. In the color filter CF, a colored layer R composing a red pixel, a colored layer G composing a green pixel, and a colored layer B composing a blue pixel B are arranged in the X-direction. A plurality of colored layers R, G, and B are provided at locations in conformity with a pixel arrangement of the liquid crystal display device which performs full color display.

The display device substrate 100A can be used for not only the liquid crystal display device but also for a display device such as an organic EL display device.

The black layer 1 configuring the first wiring layer 3 is a light shielding layer of which the major color material is carbon, similarly to the first embodiment. The first metal layer 2 has the same line width as the black layer 1 and is laminated on the black layer 1. The first metal layer 2 is composed of, for example, three-layer copper alloy having a structure in which a copper alloy layer containing 0.5 at % magnesium is sandwiched by copper alloy layers containing 18 at % indium. An indium-containing layer that contains an indium-copper alloy or an indium oxide, such as ITO, has high adhesion to glass or resin and achieves reliable electrical connection.

FIG. 13 is a cross-sectional view showing a part of an end portion of the display device substrate 100A.

As shown in FIG. 13, the display device substrate 100A is provided with a terminal portion 11 which is disposed outside the effective display region 15 and used for electrical connection. The terminal portion 11 is configured of two layers of the black layer 1 and the first metal layer 2. The first metal layer 2 is exposed to a surface layer of the terminal portion 11. As described above, the outermost surface of the first metal layer 2 is formed of a metal alloy containing indium.

FIG. 11 is a cross-sectional view showing a part of the liquid crystal display device LCD' according to the third embodiment of the present invention. The liquid crystal display device LCD' includes the display device substrate 100A provided with the color filter CF shown in FIG. 12. The array substrate 200 has the same configuration as the first embodiment. The liquid crystal layer 30 is aligned in parallel to the surface of the array substrate 200 and driven by the fringe electric field generated between the pixel electrode 21 and the common electrode 22. According to the liquid crystal display device LCD' of the third embodiment, effects similar to those of the first embodiment can be obtained. Further, since the color filter CF is included in the device, full color display can be accomplished by applying a backlight unit emitting white light to the liquid crystal display device LCD'. Therefore, a field sequential method is not required to be used.

The liquid crystal display device of the present embodiment can be used for various applications. Electronic equipment to which the liquid crystal display device of the present embodiment can be applied includes cellular phones, portable game machines, portable information terminals, personal computers, digital books, video cameras, digital still cameras, head-mounted displays, liquid crystal projectors, navigation systems, sound reproducing systems (car audio systems, digital audio players or the like), copying machines, facsimiles, printers, printer multifunction machines, vending machines, automatic teller machines (ATM), personal authentication devices, wearable electronic devices, on-vehicle display devices, and optical communication devices. The above-described embodiments can be combined as desired for use.

Some embodiments of the present invention have so far been described in their preferred forms. These embodiments are only examples of the present invention, and should not be construed as limiting the present invention.

Addition, omission, replacement, and other modifications can be made without departing from the scope of the present invention. Accordingly, the present invention should not be construed as being limited by the forgoing descriptions but should be construed as being limited by the scope of the claims.

REFERENCE SIGNS LIST

1: black layer
2: first metal layer
3: first wiring layer
4', 4: black matrix
5: second transparent resin layer
6: first transparent resin layer
10: transparent substrate (first transparent substrate)
10a: second surface
10b: first surface
11: terminal portion
11a: terminal region
12: opening
15: effective display region (display region)
20: transparent substrate (second transparent substrate)
21: pixel electrode
22: common electrode
23: second wiring layer
24: first insulation layer
25: second insulation layer
26: third insulation layer
27, 28: floating pattern
50: channel layer
51: active element
52: gate wiring
53: gate electrode
54: source wiring
55: source electrode
59: light shielding pattern (light shielding layer)
60: contact hole
100, 100A: display device substrate (counter substrate)
200: array substrate
R: red pixel (colored layer)
G: green pixel (colored layer)
B: blue pixel (colored layer)
CF: color filter
Fx, Fy: frame portion

What is claimed is:

1. A liquid crystal display device comprising:
a counter substrate including a first transparent substrate having a display region and a terminal region located outside the display region, and a first wiring layer having a laminate structure of a black layer and a first metal layer, the first wiring layer being disposed on a first surface of the first transparent substrate;
a liquid crystal layer; and
an array substrate including a second transparent substrate, an active element disposed on the second transparent substrate and having a transistor structure including a gate electrode, and a second wiring layer orthogonally crossing the first wiring layer, the array substrate being bonded to the first surface of the first transparent substrate via the liquid crystal layer, wherein
the terminal region is provided with a plurality of terminal portions each having the laminate structure of the black layer and the first metal layer;
the counter substrate is provided with the first wiring layer, a black matrix having a plurality of openings formed in the display region, and a first transparent resin layer covering the black matrix, laminated on the first surface in this order;
the black matrix has a line width larger than a line width of the first wiring layer and overlaps with the first wiring layer so as to include a pattern of the first wiring layer in plan view;
the second wiring layer is formed of a second metal layer, and a light shielding pattern is provided with the second metal layer;
the active element is covered with the light shielding pattern via a first insulation layer provided on the active element;
the second wiring layer and the light shielding pattern are spaced apart and electrically insulated from each other; and
the device is configured to detect a change in electrostatic capacitance produced between the first wiring layer and the second wiring layer, thereby permitting a touch sensing operation to be performed.

2. The liquid crystal display device of claim 1, wherein
the opening has a long side and a short side; and
the second wiring layer is provided in parallel to the short side of the opening in plan view.

3. The liquid crystal display device of claim 1, wherein
the array substrate has a gate wiring electrically connected to the gate electrode; and
the second wiring layer is provided on the first insulation layer so as to extend in parallel to the gate wiring in plan view.

4. The liquid crystal display device of claim 1, wherein
the second wiring layer has a constant electric potential.

5. The liquid crystal display device of claim 1, wherein
the device comprises a color filter layer provided between the first metal layer and the first transparent resin layer.

6. The liquid crystal display device of claim 1, wherein
the first transparent resin layer is provided between the black matrix and the liquid crystal layer.

7. The liquid crystal display device of claim 1, wherein
the black matrix has a relative dielectric constant in a range from 3.0 to 4.4.

8. The liquid crystal display device of claim 1, wherein
the active element is a transistor provided with a channel layer containing two or more metal oxides selected from gallium, indium, zinc, tin and germanium oxides, and
the channel layer is configured to permit a time margin at a time of performing the touch sensing operation to be widened.

9. The liquid crystal display device of claim 1, wherein
the array substrate includes a pixel electrode, a common electrode provided between the pixel electrode and the second transparent substrate, and a second insulation layer provided between the pixel electrode and the common electrode;
the active element is electrically connected to the pixel electrode; and
the liquid crystal layer is driven by a voltage applied between the pixel electrode and the common electrode.

10. The liquid crystal display device of claim 1, wherein
the liquid crystal layer has an initial alignment in parallel to a surface of the second transparent substrate.

11. A display device substrate used for the liquid crystal display device according to claim 1, comprising:
a transparent substrate having a first surface, a second surface opposite to the first surface, a display region and a terminal region provided on the first surface and located outside the display region;
a wiring layer provided on the first surface and having a laminate structure of a black layer and a metal layer of an equal line width, and also having a metal oxide including indium oxide as an underlayer or a surface layer of the metal layer;
a plurality of terminal portions provided on the terminal region and having the laminate structure of the black layer and the metal layer;
a black matrix provided to cover the wiring layer, the black matrix having a plurality of openings formed in the display region and having a line width larger than that of the wiring layer, while overlapping with the wiring layer so as to include a pattern of the wiring layer in the display region in plan view; and
a first transparent resin layer covering the black matrix.

12. The display device substrate of claim 11, wherein
a second transparent resin layer is provided between the metal layer and the black matrix.

13. A display device substrate used for the liquid crystal display device of claim 1, comprising:
a transparent substrate having a first surface, a second surface opposite to the first surface, a display region and a terminal region provided on the first surface and located outside the display region;
a wiring layer provided on the first surface and having a laminate structure of a black layer and a metal layer of an equal line width, and also having a metal oxide including indium oxide as an underlayer or a surface layer of the metal layer;
a plurality of terminal portions provided on the terminal region and having the laminate structure of the black layer and the metal layer;
a black matrix provided to cover the wiring layer, the black matrix having a plurality of openings formed in the display region and having a line width larger than that of the wiring layer, while overlapping with the wiring layer so as to include a pattern of the wiring layer in the display region in plan view;
a color filter layer disposed in the display region so as to be located between the metal layer and the black matrix; and
a first transparent resin layer covering the black matrix.

14. The display device substrate of claim 13, wherein
a second transparent resin layer is provided between the color filter layer and the black matrix.

15. The display device substrate of claim 11, wherein
a relative dielectric constant of the black matrix ranges from 3.0 to 4.4.

16. The display device substrate of claim 13, wherein
a relative dielectric constant of the black matrix ranges from 3.0 to 4.4.

* * * * *